United States Patent [19]
Dassel et al.

[11] Patent Number: 5,591,415
[45] Date of Patent: Jan. 7, 1997

[54] REACTOR FOR SUPERCRITICAL WATER OXIDATION OF WASTE

[75] Inventors: Mark W. Dassel, Wilmington, Del.;
Donald C. Matter, Houston, Tex.;
Donald H. Rennie, Murrysville, Pa.;
Roy N. McBrayer, Jr., Austin; James E. Deaton, Georgetown, both of Tex.;
Fred W. Thompson, Lexington Park, Md.

[73] Assignee: RPC Waste Management Services, Inc., Austin, Tex.

[21] Appl. No.: 260,954

[22] Filed: Jun. 16, 1994

Related U.S. Application Data

[63] Continuation-in-part of Ser. No. 188,229, Jan. 27, 1994.

[51] Int. Cl.$^6$ .............................. B01J 19/00; B01J 3/00; A62D 3/00; B09B 3/00
[52] U.S. Cl. ......................... 422/241; 422/242; 423/659; 588/205; 588/900
[58] Field of Search ........................... 423/659; 588/205, 588/208, 213, 218, 222, 226, 233, 242, 900; 422/241, 242

[56] References Cited

U.S. PATENT DOCUMENTS

| | | | |
|---|---|---|---|
| 1,986,196 | 1/1935 | Grosse | 422/241 |
| 2,398,546 | 4/1946 | Messmore | 422/241 |
| 2,545,384 | 3/1951 | Rehrig | 422/241 |
| 2,824,058 | 2/1958 | Zimmermann . | |
| 2,944,396 | 7/1960 | Barton et al. | 60/39.05 |
| 3,047,003 | 7/1962 | Gurney . | |
| 3,047,371 | 7/1962 | Krause et al. . | |
| 3,282,459 | 11/1966 | Wilson | 422/242 |
| 3,449,247 | 6/1969 | Bauer | 210/63 |
| 3,464,885 | 9/1969 | Land et al. | 162/17 |
| 3,472,632 | 10/1969 | Hervert et al. | 422/241 |
| 3,515,520 | 6/1970 | Hervert | 422/242 |

(List continued on next page.)

FOREIGN PATENT DOCUMENTS

| | | |
|---|---|---|
| 2410504 | 8/1979 | France . |
| 521233 | 9/1976 | U.S.S.R. . |
| 483881 | 11/1977 | U.S.S.R. . |
| 576683 | 1/1980 | U.S.S.R. . |
| 92/18428 | 10/1992 | WIPO . |
| 92/06459 | 12/1992 | WIPO . |

OTHER PUBLICATIONS

Chowdhury et al., "Catalytic Wet Oxidation of Strong Waste Waters", AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation—Deep Well Technology for Toxic Wastewaters and Sludges," Technical Report, The University of Texas at Austin, 1989.

Murkes et al., *Crossflow Filtration: Theory and Practice*, John Wiley & Sons: New York, 1988.

Opatken, "Aqueous–Phas Oxidation of Sludge Using the Vertical Reaction Vessel System," EPA/600/2–87/022, Mar. 1987.

Perona et al., "A Pilot Plant for Sewage Treatment by Cross–Flow Filtration," Oak Ridge Natl. Lab. Technical Report ORNL–TM–4659, Oct. 1974.

(List continued on next page.)

*Primary Examiner*—Gary P. Straub
*Attorney, Agent, or Firm*—Conley, Rose & Tayon, P.C.

[57] ABSTRACT

A reactor enclosed in a pressure vessel in a manner that the walls of the pressure vessel are thermally insulated and chemically isolated from the harsh environment of the reaction zone in the reactor. This allows the pressure vessel to handle the high pressures involved, since it is maintained at a reasonably low temperature range. Simultaneously, it allows the reactor to handle the high temperatures involved, since the pressure differentials around it are only minimal.

48 Claims, 13 Drawing Sheets

U.S. PATENT DOCUMENTS

| | | | |
|---|---|---|---|
| 3,606,999 | 9/1971 | Lawless | 23/1 |
| 3,682,142 | 8/1972 | Newkirk. | |
| 3,743,606 | 7/1973 | Marion et al.. | |
| 3,852,192 | 12/1974 | Fassell et al.. | |
| 3,853,759 | 12/1974 | Titmas | 210/63 |
| 3,876,497 | 4/1975 | Hoffman. | |
| 3,900,300 | 8/1975 | Lehman | 55/184 |
| 3,912,626 | 10/1975 | Ely et al. | 210/50 |
| 3,920,548 | 11/1975 | Fassell et al.. | |
| 3,929,429 | 12/1975 | Crouch. | |
| 3,938,972 | 2/1976 | Sugimura | 55/440 |
| 3,945,805 | 3/1976 | Costello et al.. | |
| 3,945,806 | 3/1976 | Costello et al.. | |
| 4,005,803 | 2/1977 | Kent. | |
| 4,013,560 | 3/1977 | Pradt. | |
| 4,017,421 | 4/1977 | Othmer. | |
| 4,113,446 | 9/1978 | Modell et al.. | |
| 4,141,829 | 2/1979 | Thiel et al. | 210/63 |
| 4,199,545 | 4/1980 | Matovich. | |
| 4,215,094 | 7/1980 | Inao et al. | 423/123 |
| 4,217,218 | 8/1980 | Bauer | 210/63 |
| 4,221,577 | 9/1980 | Lowrie | 55/392 |
| 4,221,763 | 9/1980 | Greene | 422/241 |
| 4,229,296 | 10/1980 | Wheaton et al. | 210/758 |
| 4,272,383 | 6/1981 | McGrew | 210/741 |
| 4,284,015 | 8/1981 | Dickinson. | |
| 4,292,953 | 10/1981 | Dickinson | 126/263 |
| 4,326,957 | 4/1982 | Rosenberg | 210/436 |
| 4,338,199 | 6/1982 | Modell | 210/721 |
| 4,344,785 | 8/1982 | Jensen. | |
| 4,370,223 | 1/1983 | Bose | 208/125 |
| 4,377,066 | 3/1983 | Dickinson | 60/39.05 |
| 4,378,976 | 4/1983 | Rush. | |
| 4,380,960 | 4/1983 | Dickinson | 110/347 |
| 4,384,897 | 5/1983 | Brink | 127/37 |
| 4,460,628 | 7/1984 | Wheaton et al. | 427/214 |
| 4,526,584 | 7/1985 | Funk. | |
| 4,541,990 | 9/1985 | Mitterbacher | 422/241 |
| 4,543,190 | 9/1985 | Modell | 210/721 |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,643,890 | 2/1987 | Schramm. | |
| 4,668,256 | 5/1987 | Billiet et al. | 55/219 |
| 4,683,122 | 7/1987 | Concordia et al.. | |
| 4,698,157 | 10/1987 | Gillot | 210/496 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,792,408 | 12/1988 | Titmas | 210/747 |
| 4,793,153 | 12/1988 | Hembree et al. | 62/476 |
| 4,822,394 | 4/1989 | Zeigler et al. | 62/17 |
| 4,822,497 | 4/1989 | Hong et al. | 210/721 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,878,543 | 11/1989 | Chornet et al. | 210/759 |
| 4,880,440 | 11/1989 | Perrin | 55/16 |
| 4,887,628 | 12/1989 | Bowe et al.. | |
| 4,891,139 | 1/1990 | Zeigler et al. | 210/747 |
| 4,898,107 | 2/1990 | Dickinson | 110/346 |
| 4,936,990 | 6/1990 | Brunsell et al. | 210/331 |
| 4,963,329 | 10/1990 | Burgess et al.. | |
| 4,968,328 | 11/1990 | Duke | 55/1 |
| 4,983,296 | 1/1991 | McMahon et al. | 210/603 |
| 5,009,857 | 4/1991 | Hearle | 422/180 |
| 5,011,614 | 4/1991 | Gresser et al. | 210/761 |
| 5,053,142 | 10/1991 | Sorensen et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,133,877 | 7/1992 | Rofer et al. | 210/761 |
| 5,167,930 | 12/1992 | Fassbender | 422/242 |
| 5,183,577 | 2/1993 | Lehman | 210/761 |
| 5,186,910 | 2/1993 | Alagy et al.. | |
| 5,192,453 | 3/1993 | Keckler et al. | 210/761 |
| 5,199,853 | 4/1993 | Padden. | |
| 5,207,399 | 5/1993 | Risberg et al.. | |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |
| 5,280,701 | 1/1994 | Tolman. | |
| 5,326,540 | 7/1994 | Chastagner | 422/205 |
| 5,339,621 | 8/1994 | Tolman. | |
| 5,358,646 | 10/1994 | Gloyna et al.. | |
| 5,384,051 | 1/1995 | McGinness | 588/209 |
| 5,385,214 | 1/1995 | Spurgeon. | |
| 5,387,398 | 2/1995 | Mueggenburg et al.. | |
| 5,417,937 | 5/1995 | Voigt et al.. | |
| 5,417,953 | 5/1995 | Cappelli. | |
| 5,421,998 | 6/1995 | Li et al.. | |
| 5,425,883 | 6/1995 | Reid et al.. | |
| 5,437,798 | 8/1995 | LaRoche et al.. | |
| 5,454,950 | 10/1995 | Li et al.. | |

OTHER PUBLICATIONS

Shapira et al., "Removal of Heavy Metals and Suspended Solids from Battery Wastewaters: Application of Hydroperm Cross–flow Microfiltration," Gen. Battery Corp. Report EPA/600/2–81–147, Aug. 1981.

Thomason et al., "Supercritical Water Destruction of Aqueous Wastes," *Hazardous Waste*, 1(4), 453–467 (1984).

Teletzke, "Wet Air Oxidation," *Chem. Eng. Prog.*, 60(1), pp. 33–38, Jan. 1964.

Yang et al., "Homogeneous Catalysis in the Oxidation of p–Chlorophenol in Supercritical Water," *Ind. Eng. Chem. Res.*, 27(1), pp. 2009–2014 (1988).

Zimmermann, "New Waste Disposal Process," *Chem. Eng.*, pp. 117–120, Aug., 1985.

Jacobs et al., "Phase Segregation," *Handbook of Separation Process Technology*, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep. 1989.

Todheide et al., "Das Zweiphasengebiet und die kritische Kurve im System Kohlendioxid–Wasser bis zu Druken von 3500 bar," *Zeitschrift fur Physikalischo Chemie Neue Folge*, Bd. 37, 8. 387–401 (1963).

Zimmermann et al., "The Zimmermann Process and Its Applications in the Pulp and Paper Industry," TAPPI, 43 (8), pp. 710–715 (1960).

Keng–Chen Chang et al., "Supercritical water oxidation of acetic acid by potassium permanganate," *J. of Hazardous Materials*, vol. 32, pp. 001–012.

Yoshiaki Harada, "Wet Catalytic Oxidation Process for Wastewater Treatment," Abstract (1991).

Sellchiro Imamura et al., "Wet Oxidation of Ammonia Catalyzed by Cerium–Based Composite Oxides," *Ind. Eng. Chem. Prod. Res. Dev.*, vol. 24, No. 1, pp. 75–80 (1985).

Lei Jin et al, "The Effect of Supercritical Water on the Catalytic Oxidation of 1–4–Dichlorobenzene," presented by AIChE Spring Meeting, Orlando, FL, Mar. 19–23 (1990), Abstract.

Dong–Soo Lee et al., "Efficiency of $H_2O_2$ in Supercritical Water Oxidation of 2, 4–Dichlorophenol and Acetic Acid," presented at AIChE Spring Meeting, Orlando, FL, Mar. 18–22 (1990).

Teletzke et al., "Components of Sludge and Its Wet Air Oxidation Products," *Journal WPCF*, 39 (6):994–1005, 1967.

Conditt and Sievers, "Microanalysis of Reaction products in Sealed Tube Wet Air Oxidations by Capillary Gas Chromatography," *Anal. Chem.*, 56:2620–2622, 1984.

McGinnis et al., "Conversion of Biomass into Chemicals with High–Temperature Wet Oxidation," *Ind. Eng. Chem. Prod. Res. Dev.*, 22(4):633–636, 1984.

Baker et al., "Membrane Separation Systems—A Research & Development Needs Assessment," *Department of Energy Membrane Separation Systems Research Needs Assessment Group, Final Report*, II, Mar. 1990.

Urusova, "Phase Equilibria in the Sodium Hydroxide–Water and Sodium Chloride–Water Systems at 350–550 deg.," *Russian Journal of Inorganic Chemistry*, 19(3):450–454, 1974.

Valyashko, "Phase Equilibria in Water–Salt Systems: Some Problems of Solubility at Elevated Temperature and Pressure," *High Temperature High Pressure Electrochemistry in Aqueous Solutions*. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," *Society of Automotive Engineers, Inc.*, pp. 189–203, 1990.

Dell–Orco et al., "The Solubility of 1:1 Nitrate Electrolytes in Supercritical Water," *Los Alamos National Lab Report*, LA–UR–92–3359, pp. 1–17, 1992.

Martynova, "Solubility of Inorganic Compounds in Subcritical and Supercritical Water," *High Temperature High Pressure Electrochemistry in Aqueous Solutions*. National Association of Corrosion Engineers, 4:131–138, 1976.

Armellini and Tester, "Solubilities of Sodium Chloride and Sodium Sulfate in Sub–and Supercritical Water Vapor," AIChE National Meeting, Los Angeles, California, Nov. 17–22, 1991, pp. 1–15.

Excerpts From Publication Showing Salt Mixture Properties (pp. 124, 780, 781, 814, 816).

A. G. Fassbender, Supercritical Water Oxidation Workshop, "The Dual Shell Pressure Balanced Vessel: A Reactor For Corrosive Applications,"(11 pages).

Excerpts From Publication "Strategies for Sticky Salts," (2 pages).

Eco Waste Technologies, "Fact Sheet" and photograph of SCWO Pilot Plant, Aug. 1994(2 pages).

Eco Waste Technologies, "Environmental Breakthrough: Huntsman Announces Successful Use of New Technology," (2 pages).

Austin American–Statesman, Kirk Ladendorf, article entitled "Company Hopes Treatment Cuts Waste,"(1 page).

Eco Waste Technologies, Circular on Supercritical Water Oxidation (5 pages).

Jimmy Griffith, "Destruction of Aqueous Organic Wastes by Supercritical Water Oxidation," Jun. 15–17, 1994, (12 pages).

Dr. Earnest F. Gloyna, P.E., "Supercritical Water Oxidation Applications For Industrial Sludges," Jan. 30, 1992, (pp. 1–15).

Earnest F. Gloyna and Lixiong Li, "Supercritical Water Oxidation: An Engineering Update," Feb. 1992, (pp.1–25).

Separations Research Program Center for Energy Studies, The University of Texas at Austin, "Separations Update," Spring 1994 issue, (pp. 1–4).

E. F. Gloyna, L. Li and R. N. McBrayer, "Engineering Aspects of Supercritical Water Oxidation," Wat. Sci. Tech., vol. 30, No. 9, 1994, (pp. 1–10).

J. W. Tester et al., "Supercritical Water Oxidation Technology: A Review of Process Development and Fundamental Research," Oct. 1, 1991, 60 pages.

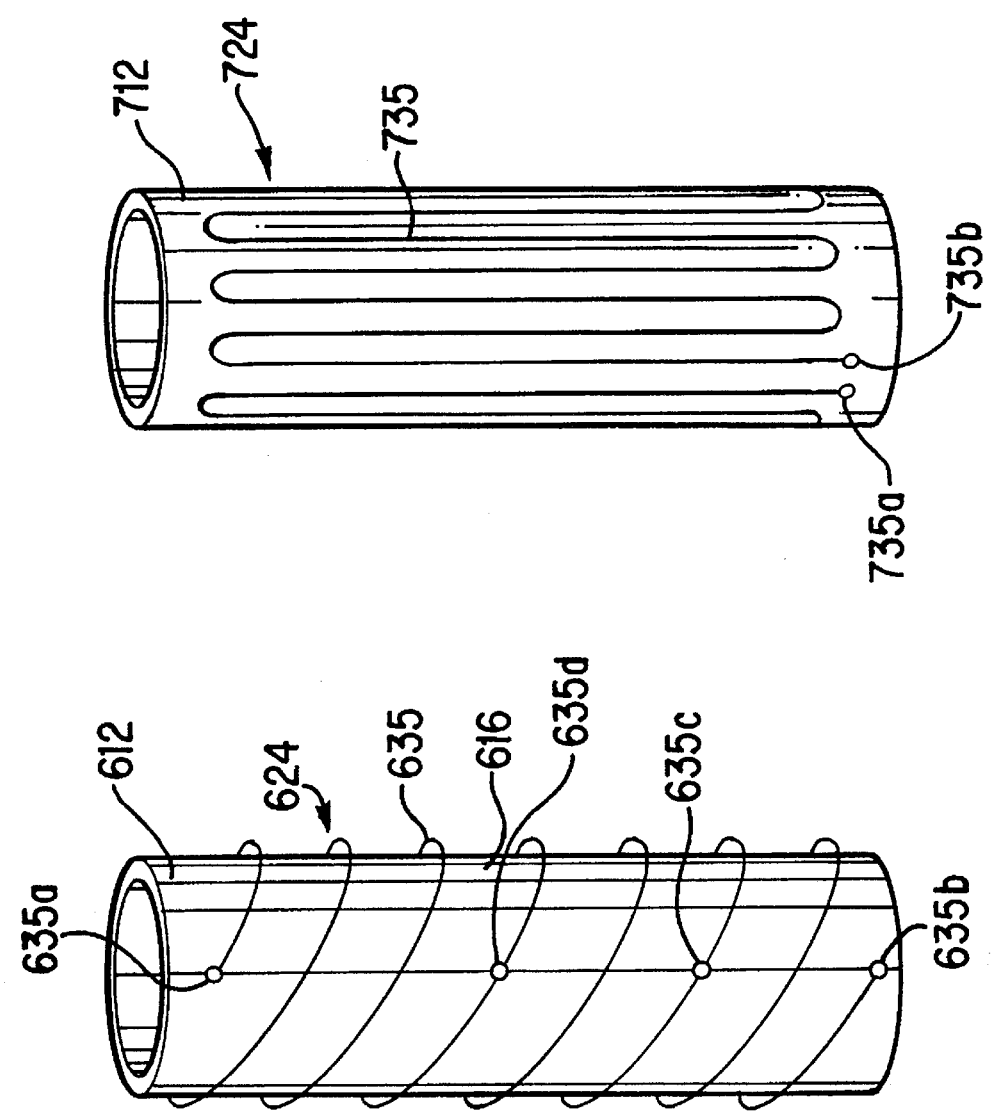

REACTOR FOR SUPERCRITICAL WATER OXIDATION OF WASTE

This is a Continuation-In-Part of application Ser. No. 08/188,229, filed on Jan. 27, 1994, which is incorporated herein by reference.

1. Field of the Invention

This invention relates to high pressure and high temperature reactors. More particularly, it relates to reactors used for oxidative waste treatment under supercritical water conditions.

2. Background of the Invention

A number of different ways for disposing of waste have been used extensively so far. Although landfilling and incineration are the major ones, they do not seem to offer the best solution.

Landfilling is becoming less and less desirable since it does not offer elimination of waste, but just underground storage. Thus, it has started to be used more for by-products of other types of waste management, such as incineration for example, than for landfilling the primary waste.

Incineration, requiring oxidation of waste at high temperatures with high volumes of air, followed by separation of the effluent gases from the produced ash and the entrained particulate matter, becomes involved, complicated, and expensive, despite the fact that at first glance it sounds to be a simple process of "just burning the waste".

In recent years, a new method, based on supercritical water oxidation, has started to be developed. The new method achieves substantially complete oxidation of waste by using considerably more compact equipment, thus becoming an excellent candidate for elimination of waste, even on site. Supercritical water oxidation also has the advantage of producing a clean water product suitable for process recycle, thereby facilitating waste minimization. In addition, it has the advantage of converting spent, costly catalysts (e.g., noble metals in both inorganic and organically bound compounds) to forms which may be more easily recovered, thereby facilitating both waste minimization and cost reduction. However, as with the development of any new process or equipment, there are numerous problems which have not been resolved so far, and which are vital for a finally successful use and commercial exploitation.

In a water liquid/vapor phase diagram, one may see that there is a critical point of temperature (about 720° F.) and a critical point of pressure (about 3,200 psia) over which there is only one single fluid phase, and which, although represents neither liquid nor vapor, behaves and seems to have more of a vapor character than of a liquid one. The single-phase condition occurring above the critical points is called supercritical condition.

It is worth noting that organic matter decomposes readily under supercritical conditions, and in the presence of oxygen carbonaceous compounds oxidize completely to carbon dioxide, sulfur compounds mostly to $SO_3$ and nitrogen compounds decompose mostly to molecular nitrogen. It is worth noting that under supercritical water oxidation conditions, only small amounts of nitrogen oxides are produced, if any, in contrast with incineration which favors the production of nitrogen oxides. Inorganic salts are substantially insoluble in the supercritical water single phase for pressures of the order of 4,000 psia, while it has been reported that they are at least partially soluble at considerably higher pressures, such as 10,000 psia, for example.

The use of very high pressures at elevated temperatures presents a serious problem in the construction of reactors which can withstand these adverse conditions. It is well known that as the temperature increases the strength of materials decreases drastically. Supercritical pressures (greater than about 3,200 psia) at temperatures exceeding about 1,000° F. present an enormous challenge to any construction material, let alone higher pressures (of the order of 10,000 psia) and temperatures, which may be desirable for a number of reasons, including dissolution of inorganic salts in the supercritical single phase. If in addition to the temperature/pressure challenge, one considers the harsh environment inside the reactor, the problem becomes highly challenging.

In order to compromise with this highly undesirable situation, excessively elongated reactors of accordingly small diameter have been practically utilized so far. These conventional reactors, however, have a number of disadvantages which include, but are not limited to restrictions on waste feed materials to preclude corrosive feeds and products of destruction, increased plugging potential due to small diameters, waste feed rate restrictions, increased safety hazards, increased investment cost, and safety hazards, as it will be discussed later, in contrast to the reactor according to this invention.

A number of patents have been dealt in general with supercritical water oxidation of coal, organic substances, and waste, among which are U.S. Pat. No. 4,141,829 (Thiel et al.), U.S. Pat. No. 4,292,953 (Dickinson), U.S. Pat. No. 4,338,199 (Modell), U.S. Pat. No. 4,377,066 (Dickinson), U.S. Pat. No. 4,380,960 (Dickinson), U.S. Pat. No. 4,543,190 (Modell), U.S. Pat. No. 4,564,458 (Burieson), U.S. Pat. No. 4,593,202 (Dickinson), U.S. Pat. No. 4,594,164 (Titmas), U.S. Pat. No. 4,792,408 (Titmas), U.S. Pat. No. 4,822,394 (Zeigler et al.), U.S. Pat. No. 4,822,497 (Hong et al.), U.S. Pat. No. 4,861,497 (Welch et al.), U.S. Pat. No. 4,891,139 (Zeigler et al.), U.S. Pat. No. 5,075,017 (Hossain et al.), U.S. Pat. No. 4,113,446 (Modell et al.), U.S. Pat. No. 4,338,199 Reexamined (Modell), U.S. Pat. No. 5,106,513 (Hong), U.S. Pat. No. 4,898,107 (Dickinson), U.S. Pat. No. 4,983,296 (McMahon et al.), U.S. Pat. No. 5,011,614 (Gresser et al), U.S. Pat. No. 5,053,142 (Sorensen et al.), U.S. Pat. No. 5,057,231 (Mueller et al.), U.S. Pat. No. 5,106,513 (Hong), U.S. Pat. No. 5,133,877 (Rofer et al.), U.S. Pat. No. 5,183,577 (Lehmann), U.S. Pat. No. 5,192,453 (Keckler et al.), U.S. Pat. No. 5,221,486 (Fassbender), U.S. Pat. No. 5,232,604 (Swallow et al.), U.S. Pat. No. 5,232,605 (Baur et al.), U.S. Pat. No. 5,240,619 (Copa et al.), U.S. Pat. No. 5,250,193 (Sawicki et al.), and U.S. Pat. No. 5,252,224 (Modell et al.).

U.S. Pat. No. 3,472,632 (Hervert et al) discloses an internally lined reactor comprising an external pressure retaining chamber, an intermediate porous metal layer within the chamber, and a continuous metal liner positioned along the inner wall of the porous layer. A metal casing encompasses and is spaced from the external chamber. Partitions divide the space between chamber and casing into a number of separate compartments encompassing the chamber. A number of spaced apart leakage passageways are extended through and distributed over the surface of the chamber, and at least one monitoring passageway for each compartment is provided through the casing.

U.S. Pat. No. 3,515,520 (Hervert) discloses a reactor for accommodating corrosive materials wherein a corrosion liner is suspended within an outer reaction chamber and in a non-contacting relationship therewith, the chamber having an inlet for non-corrosive gases at its lower end admitting such gases to the annular space between liner and chamber with a passageway at the top of the liner for admission of such gases, and an adjacent corrosive fluid inlet into the liner with centrally disposed discharge means from said liner for exit of reaction products of the corrosive and non-corrosive gases.

U.S. Pat. No. 4,199,545 (Matovich) discloses a fluid-wall reactor for high temperature chemical reactions comprising (A) a porous reactor tube made of fabric or fibrous refractory material and defining a reaction zone; (B) a pressure vessel enclosing the reactor tube to define an inert fluid plenum, the pressure vessel having at least one inlet for admitting the inert fluid which is directed under pressure through the porous tube wall to provide a protective blanket for the inside surface for the inside surface of the reactor tube; (C) means for introducing at least one reactant into the reaction zone; (D) means in the plenum for heating the reactor tube; and (E) a heat shield disposed within the pressure vessel, substantially enclosing the heating means and the reaction zone to define a black body cavity, the heat shield reflecting radiant energy toward the reaction zone.

U.S. Pat. No. 4,643,890 (Schramm) discloses a reactor tube for a high-temperature fluid wall reactor made of refractory material which permits the tube to be heated to incandescence. The reactor tube in turn radiates energy inwardly to a reaction zone to sustain the desired high-temperature reaction. At least part of the tube is perforated to permit an inert gas to form a protective fluid wall for preventing the reactant products from contacting the inner surface of the tube.

U.S. Pat. No. 4,737,348 (Levin) discloses a reactor apparatus for continuously producing molten, solar grade purity elemental silicon by thermal reaction of a suitable precursor gas, such as silane.

U.S. Pat. No. 5,186,910 (Alagy et al.) discloses an oxidation reactor having an elongated shape and including in combination, a mixing member having a pipe for feeding oxidizing gas and a pipe for feeding oxidizable charge; a reaction member, arranged subjacent the mixing member; and a discharge member associated with a discharge pipe for the products of the reaction. The reaction member includes a central zone which has a first lining and the reactor includes at least one peripheral zone, which has a second lining, passages in the second lining being smaller than passages in the first lining so that the pressure loss in the second lining is greater than that of the first lining. The second lining forms a sleeve surround the first lining and this sleeve is formed of at least one refractory heat insulating material. The oxidation reactor is provided with an external sleeve steel jacket, a concrete wall and a steel element surrounding the mixing member arranged above the reaction member. The reaction member includes a series of single elements which form juxtaposed channels.

U.S. Pat. No. 5,225,169 (Elvin et al.) discloses an improved sulfider for receiving high temperature catalysts from a hydrocarbon cracking operation and subjecting the catalyst to a sulfur-containing gas. The treating unit includes an outer metal housing and first refractory layer within the metal housing for minimizing heat loss from the treatment unit. A second refractory layer is provided within the first refractory layer and defines an interior chamber within the treatment unit, and a plurality of heating units are spaced circumferentially along the interface of the first and second refractory layers. The heating units substantially minimize the temperature differential across the second refractory layer and thereby minimize the heat loss from the high temperature catalyst within the chamber.

None of the above references has resolved the vital problem of pressure/temperature/harsh-environment in a satisfactory manner, and especially under supercritical water conditions.

SUMMARY OF THE INVENTION

This invention pertains to high pressure and high temperature reactors. It pertains especially to reactors operating under supercritical water conditions combined with corrosive atmosphere, wherein the pressure/temperature/harsh environment conditions cannot be handled by the reactors of the presently existing art. This invention relates, more particularly, to a reactor comprising an assembly of a reaction chamber surrounding a reaction zone, and having an inside wall, an outside wall, a front end, and a back end opposite the front end;

a pressure vessel surrounding the outside wall of the reaction chamber, thus forming a first annulus;

a reactant entry for introducing reactants to the reaction chamber;

a thermal insulator in the first annulus between the outside wall of the reaction chamber and the pressure vessel adaptable to thermally insulate said outside wall from said pressure vessel; and a chemical isolator adaptable to prevent any reactants, reaction products, and effluent gases from entering the first annulus from the reaction chamber.

This invention also pertains to a method of treating waste under supercritical water conditions comprising the steps of introducing waste into a reactor, the reactor comprising an assembly of a reaction chamber surrounding a reaction zone, and having an inside wall, an outside wall, a front end, and a back end opposite the front end;

a pressure vessel surrounding the outside wall of the reaction chamber, thus forming a first annulus;

a reactant entry for introducing reactants to the reaction chamber;

a thermal insulator in the first annulus between the outside wall of the reaction chamber and the pressure vessel adaptable to thermally insulate said outside wall from said pressure vessel; and a chemical isolator adaptable to prevent any reactants, reaction products, and effluent gases from entering the first annulus from the reaction chamber.

maintaining within the reaction chamber a reaction zone having a temperature of at least 720° F. and a pressure of at least 3200 psia in order to oxidize the waste and produce an effluent gas of substantially complete combustion, thus resulting in a completely oxidized product;

passing a pressurized innocuous fluid through the first annulus in a manner to prevent any reactants, products of reaction, and effluent gas from entering said first annulus; and disposing of the effluent gas.

It is preferable that the effluent gas is cooled and neutralized in a transition zone within a disengagement vessel connected to the pressure vessel in the vicinity of the back end of the reaction chamber, the disengagement vessel having an inside wall and an outside wall.

It is also preferable that the reactant entry is located at the front end of the reaction chamber, while it may also be extended within the reaction chamber.

Further, it is preferred that the thermal insulator comprises an inorganic insulator suitable for temperatures higher than 720° F., more preferred that the inorganic insulator comprises a compound selected from the group consisting of ceramic and mineral, and even more preferred that the inorganic insulator is fibrous ceramic paper. In a different preferred embodiment, the thermal insulator comprises a radiant shield, and more preferably, the thermal insulator comprises a combination of an inorganic insulator and a radiant shield.

It is critical that the first annulus is filled with an innocuous fluid during operation of the reactor. Thus, it is preferable that the chemical isolator comprises a valve for allowing innocuous fluid to enter the first annulus. It is further preferable that the chemical isolator also comprises a fluid discharge passage in the vicinity of the back end and adjacent to the outside wall of the reaction chamber.

When the environment inside the reaction chamber is harsh, it is critical that the inside wall of the reaction chamber is covered with a material resistant to attack by the reactants, the products of reaction and the effluent gases. This resistant material preferably comprises a noble metal, such as for example palladium, platinum, rhodium, and the like. Nevertheless, the most preferred noble metal is platinum, as in general its corrosion behavior is more resistant than that of the rest of the noble metals.

It has also been found unexpectedly that titanium is very resistant, and in many occasions considerably more resistant than noble metals, in harsh environments encountered in supercritical and subcritical water conditions. There are many advantages in using a titanium liner in place of a noble metal liner. First of all, titanium is readily available and it costs much less than platinum; for example, platinum costs at least 150 times as much as titanium. Since titanium is a well known and widely used material, many proven manufacturing procedures are already qualified. In addition to these advantages, if titanium is used as the construction material for the reaction chamber (not just as a liner), the pressure differential between the annulus and the reaction zone may be increased to 200–300 psi or higher, if so desired, by increasing the wall thickness. Furthermore, a corrosion allowance of 0.03 to 0.12 inch per year, may be allowed for the walls of the reaction chamber.

The reaction chamber and the pressure vessel have preferably a concentric tubular configuration.

Furthermore, it is preferable that the pressure vessel and the disengagement vessel are connected through a ring having a first reverse L-shaped cross section, in a manner that a first part of the ring is restricted between the pressure vessel and the disengagement vessel, and a second part of the ring forms a fluid discharge passage with the reaction chamber at its back end, and also forms a cooling gap with the disengagement vessel.

It is important that the reactor comprises a cooling portion adaptable to cool down the disengagement vessel, the products of reaction, and the effluent gases, especially for a certain class of materials, wherein either the waste or the products of reaction are of corrosive nature. It is preferable that the cooling portion, which is adapted to cool the disengagement vessel, comprises an opening within the cooling gap adaptable to provide cooling water in the form of a film on the inside wall of the disengagement vessel. It should be noted, however, that if the waste matter and its reaction products are relatively innocuous, the disengagement chamber may not be necessary.

When the products of reaction and the effluent gases contain reactive entities, such as for example sulfur trioxide, hydrogen chloride, and the like, the reactor should further comprise an additive entry which is used to introduce additives either in the reactant entry or preferably into the transition zone for neutralizing the products of reaction. In case that the additives are introduced into the transition zone, it would be preferable that the cooling portion and the additive entries are combined into one entity.

A preferred reactor of the present invention further comprises a longitudinal expansion joint and a radial expansion joint, both joints being connected to the reaction chamber and isolating the reaction zone from the first annulus. The longitudinal expansion joint may have the form of a bellows, and the radial expansion joint may have the form of U. Preferably, the longitudinal expansion joint is disposed closer to the front end of the reaction chamber, and a radial expansion joint is closer to the back end of the reaction chamber. This arrangement compensates for higher expansion of the reaction chamber, which is subjected to higher temperature differentials, than the expansion of the pressure vessel, which is subjected to lower temperature variations.

In a preferred reactor, the reactant entry is surrounded by a premixing chamber, having preferably a cylindrical configuration. In this occasion, the bellows serving as a longitudinal expansion joint and having an upper end and a lower end, is disposed in a manner that the upper end is hermetically connected to the premixing chamber, and the lower end is hermetically connected to the front end wall of the reaction chamber.

The lower end of the bellows may surround the premixing chamber and be free to move in a longitudinal direction with respect to the premixing chamber. Preferably, the front end of the reaction chamber has a reduced size diameter.

A spacer may be located between a side of the U shaped radial expansion joint and a commensurate part of the pressure vessel to ensure adequate opening between said side of the U shaped radial expansion joint and said commensurate part of the pressure vessel for cooling fluid to be able to pass through.

As aforementioned, the reactor may further comprise a disengagement vessel confining a transition zone at the end of the reaction chamber, wherein the pressure vessel and the disengagement vessel are connected through a ring having a reverse L-shaped cross section, in a manner that a first part of the ring is restricted between the pressure vessel and the disengagement vessel, and a second part of the ring forms a cooling gap with the disengagement vessel. The ring may have a notch thimble, on which notch thimble, the edge of the back end of the reaction chamber may nest. The edge of the back end of the reaction chamber may also be hermetically sealed on the ring, preferably at the position of the notch thimble.

The notch thimble may also be disposed on an extension of the reverse L-shaped ring.

The longitudinal expansion joint may be in the form of a cylindrical extension of the reaction chamber, the cylindrical extension having a smaller diameter than the reaction chamber, and being in slidable engagement with a commensurate cylindrical opening of the pressure vessel. The slidable engagement may be of substantially hermetic nature, and it may comprise a stuffing box with high temperature resistant packing material.

An intermediate extension may be disposed between the cylindrical extension and the front end of the reaction chamber, the intermediate extension serving as a premixing chamber.

Premixing also involves pre-reacting of the waste water stream with oxidant. Actually, it becomes critical to have the oxidation started in the premixing chamber in order to prevent unreacted products from exiting the reactor, as it will be explained hereinbelow. Thus, the term "premixing" incorporates pre-reaction according to the present invention.

BRIEF DESCRIPTION OF THE DRAWING

The reader's understanding of practical implementation of preferred embodiments of this invention will be enhanced by reference to the following description taken in conjunction with the drawing figures, wherein

FIG. 7 shows schematically the reaction chamber of the reactor of the present invention surrounded by an alarm wire for detecting any leakage of corrosive gases from the reaction chamber to the first annulus.

FIG. 8 shows schematically the reaction chamber of the reactor of the present invention surrounded in a different manner by an alarm wire for detecting any leakage of corrosive gases from the reaction chamber to the first annulus.

DETAILED DESCRIPTION OF THE INVENTION

Figure 1:
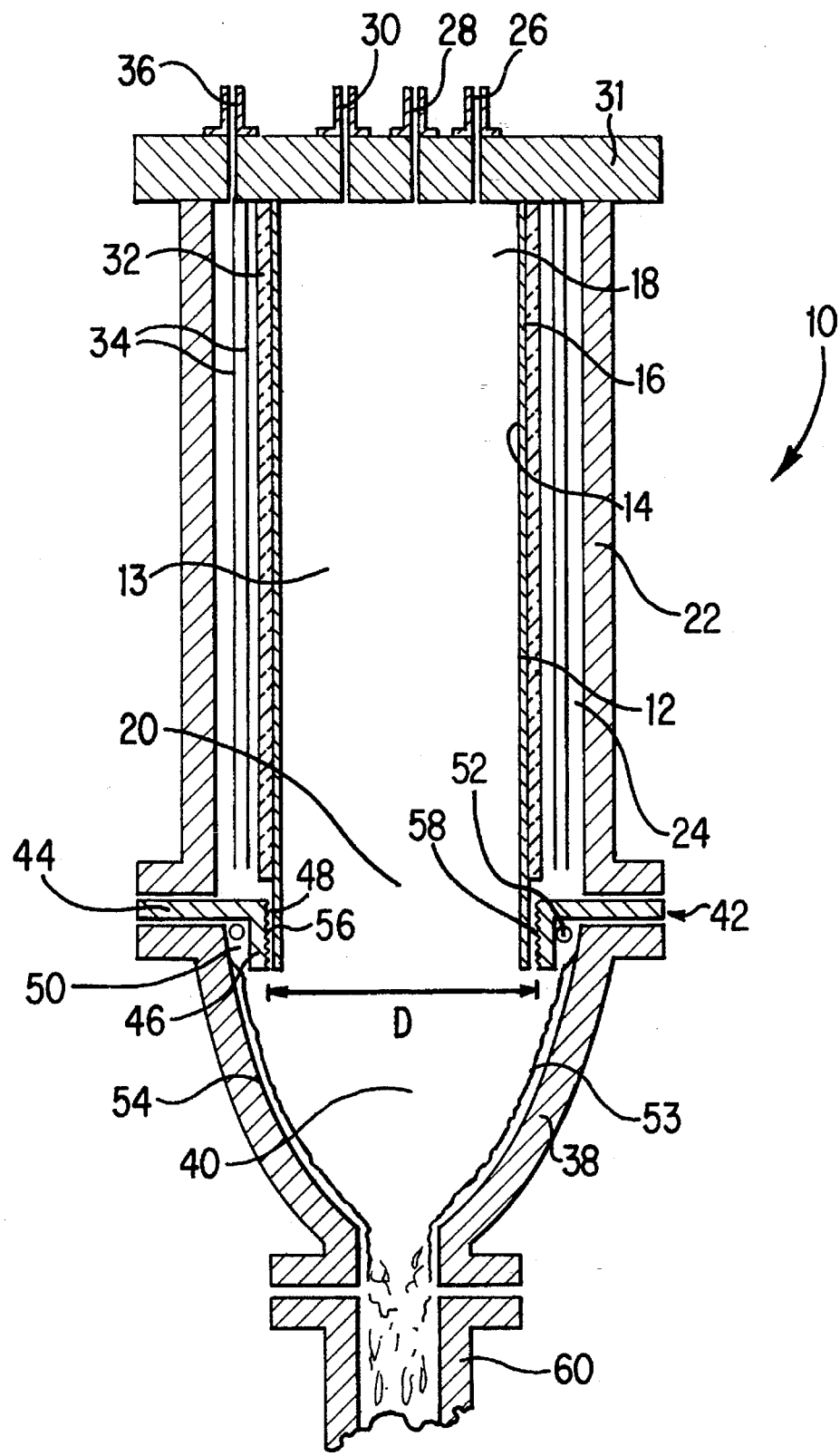
FIG. 1 shows a schematic diagram of a reactor according to a preferred embodiment of the present invention.

As aforementioned, this invention pertains to high pressure and high temperature reactors. More particularly, it pertains to reactors used for oxidative waste treatment under supercritical water conditions.

As also aforementioned, the use of very high pressures at elevated temperatures present a serious problem in the construction of reactors which can withstand these adverse conditions. It is well known that as the temperature increases the strength of materials decreases drastically. At such high pressures and temperatures, the wall thickness of a reactor so large as to be impractical. Thus, supercritical pressures (greater than about 3,200 psia) at temperatures exceeding about 1,000° F. present an enormous challenge to any construction material, let alone higher pressures (of the order of 10,000 psia) and temperatures, which may be desirable for a number of reasons, including dissolution of inorganic salts in the supercritical single phase. If in addition to the temperature/pressure challenge, one considers the harsh environment inside the reactor, the problem tends to become unsurmountable. The compromised solution to combat this undesirable situation, has been so far to utilize tube-like excessively elongated reactors of accordingly small diameter. However, this introduces in turn other disadvantages, such as heat loss, easy blockage of the tubes, excessive liner (such as noble metal for example) costs, and the like.

Other disadvantages of the conventional reactors include, but are not limited to restrictions on waste feed materials to preclude corrosive feeds and products of destruction, increased plugging potential due to small diameters, waste feed rate restrictions, increased safety hazards, increased investment cost, and safety hazards, as it will be discussed later, in contrast to the reactor according to this invention.

In dissimilarity, the present invention alleviates all these problems by using a critical combination of thermal insulation and chemical isolator in a first annulus between a reaction chamber and a pressure vessel, as well as by arranging the elements of the reactor and their operation in a manner discussed in detail hereinafter.

The present invention allows for the construction of relatively large diameter reactors, which are not practical or possible otherwise. There are several important consequential advantages, including but not limited to:

A significantly lower ratio of internal reactor chamber surface area to reaction volume Separation of corrosive atmosphere from containment (pressure) vessel results in substantially improved process safety Reduced plugging potential More compact design The lower ratio of surface area to internal volume, made possible by the relatively large diameter enabled by the invention, has several technical and economic advantages, including but not limited to:

Reduced heat loss (this optimizes waste destruction efficiency)

Significantly reduced material requirement for costly liner, such as a noble metal (e.g., may reduce requirement by more than tenfold), due to reduced ratio of lined surface per unit of reaction volume.

Preferable ratios of length to diameter according to the present invention are preferably 50 to 1, more preferably 30 to 1, even more preferably 20 to 1, even more preferably 15 to 1, and still even more preferably 12 to 1. However, all ratios in the range of 50 to 1, to 1 to 1 are applicable.

Conventional hot-wall, pipeline reactors are more typically in the range of 100 to 1, to 700 to 1 ratios.

Other advantages of the present invention will also be seen more clearly later. Many wastes naturally contain dissolved inorganic solids (e.g., NaCl salt). It is well known that these come out of solution as solid particles in supercritical water conditions, where temperatures are in excess of 800° F. The relatively large reaction chamber diameter, made possible by the present invention, reduces plugging potential in the reactor. Consequently, it is possible to treat wastes which otherwise might result in unacceptably low operating utility due to plugging in the reactor. Furthermore, it is highly desirable to add neutralizing agents to waste feed to the waste-feed heat exchanger, so that acidic hydrolysis products which form in these equipment pieces can be neutralized, thereby preventing highly undesirable corrosion. Excess neutralizing agents and neutralization salts of hydrolysis products are soluble in water at temperatures normally experienced in the waste-feed heat exchanger. However, these are known to come out of solution as solid particulates at temperatures associated with supercritical waster oxidation (e.g., temperatures equal to or greater than 800° F.).

The relatively large reaction chamber diameter, made possible by this invention, reduces plugging potential in the reactor due to the aforementioned source, thereby making feasible the highly desirable addition of neutralization agents to the heat exchanger's waste feed. Further, thanks to the large diameter, when there is excessive normal wear in the liner or coating, as it will explained in more detail later, the reaction chamber may be removed easily and inexpensively, and immediately replaced with a new one. In contrast, this is not possible with the conventional (hot-wall) reactors, since they play the role of both the pressure vessel and the reaction chamber.

According to a preferred embodiment of the present invention, better illustrated in FIG. 1, there is provided a reactor 10, which comprises a reaction chamber 12 having an inside wall 14, an outside wall 16, a front end 18 and a back end 20 opposite the front end 18.

The reaction chamber may be made of any conventional metal, such as for example carbon steel, stainless, steel and the like. Other construction materials include, but they are not limited to ceramics, quartz, sintered alumina, mineral or ceramic composites, and the like. Since, as it will be discussed hereinafter, the reaction chamber is pressurized from all sides with minimal pressure differentials, it only has to withstand the temperature and the atmosphere inside the reaction chamber. Thus, the reaction chamber does not have to be excessively strong.

A nominal wall thickness (distance between the inside wall 14 and the outside wall 16) may be in the range of 1/8" to 3/4". However, thicknesses outside this range are not excluded.

The shape of the reaction chamber 12 is preferably tubular, with a diameter and length depending on the particular application and desired capacity. Examples of nominal dimensions and rates are given at a later point of this discussion. It should be understood, however, that these figures are given only as a rough guideline and should not be construed as limiting the scope of this invention. The reactor 10 may be installed at any angle from horizontal. However, it is preferably installed in a vertical mode, with the head in an upper position and the disengagement vessel at a lower position.

If the atmosphere in the reaction chamber 12 is harsh, the inside wall 14 of the reaction chamber 12 should preferably be covered with a coating or liner withstanding the harsh atmosphere. Such a coating or liner, withstanding adverse atmospheres in general, has been found to be a noble metal. Other materials, however, may be used as protective coatings or liners, depending on the particular application. A nominal thickness of the protective coating is in the range of 0.001" to 0.050". Of course, thicknesses outside this range may be used, depending on the particular circumstances.

It has also been found unexpectedly that titanium is very resistant, and in many occasions considerably more resistant than noble metals, in harsh environments encountered in supercritical and subcritical water conditions. There are many advantages in using a titanium liner in place of a noble metal liner. First of all, titanium is readily available and it costs much less than platinum for example; platinum costs about 150 times as much as titanium. Since titanium is a well known and widely used material, many proven manufacturing procedures are already qualified. In addition to these advantages, if titanium is used as the construction material for the reaction chamber (not just as a liner), the pressure differential between the annulus and the reaction zone may be increased to 200–300 psi or higher, if so desired. Furthermore, a corrosion allowance of 0.03 to 0.12 inch per year, may be expected for the walls of the reaction chamber.

The reactor 10 also comprises a pressure vessel 22, which surrounds the outside wall 16 of the reaction chamber 12, thus forming a first annulus 24.

There is also provided multiple reactant entry 26, 28, and 30, mounted on a head 31, for introducing reactants to the reaction chamber 12. Although the head 31 is shown as a flat plate in FIG. 1, it has preferably a dished or rounded configuration in order to withstand higher pressures at lower thickness.

In the first annulus 24, between the outside wall 16 of the reaction chamber 12 and the pressure vessel 22, there are provided thermal insulators 32 and 34, adaptable to thermally insulate said outside wall 16 from the pressure vessel 22. In this preferred embodiment, thermal insulator 32 is in the form of fibrous ceramic paper, which is very effective in providing thermal insulation with respect to conduction and convection of heat. Of course, other heat-resistant insulating materials may be used. Thermal insulator 34 is in the form of one or more thermal shields, which are thin metal sheets or foils and they are effective in providing thermal insulation with regard to radiation heat. The major part of the insulation is provided by the fibrous ceramic paper, such as for example Fiberfax HSA from the Carborundum Company, Fibers Division, Niagara Falls, N.Y. The insulation 32 may be disposed only on the outside wall 16 of the reaction chamber 12, or it may also be placed over or adhered to or otherwise attached to one or more of the radiant shields 34. The radiant shields 34, in addition to their role as thermal insulators, present a physical barrier which separates the reaction chamber 12 and the containment or pressure vessel 22. This arrangement of the present invention greatly improves the safety of the system, in addition to many other advantages as described hereinwith.

The annulus 24 is constructed in a way that allows for rapid depressurization in the event of a sudden system shutdown. Specifically, small gaps are left between layers of thermal insulator 32 and radiation shields 34 to allow for rapid depressurization. These gaps may be of any suitable dimensions. For purposes of illustration, these gaps may be 1/8th to 3/16th inches thick, for example.

There is also provided a chemical isolator comprising a valve 36, communicating with the first annulus 24, for providing innocuous fluid into said annulus 24. The chemical isolator has as a primary function to prevent any reactants, products of reaction or effluent gasses to enter the first annulus 24 from the reaction chamber 12. It is critical for the purposes of this invention that the innocuous fluid is an inert gas after it enters the first annulus 24 under operating conditions. It may preferably be nitrogen, helium, argon, and the like, for example. Water, which under normal circumstances is considered to be an innocuous material, it is not innocuous for the purposes of the present invention, because at the operating pressures and temperatures, it may easily react with different components within the first annulus, unless very expensive materials (such as precious metals, for example) are utilized to cover or coat the said components.

Thus, this invention provides for a positive pressure differential to be maintained inside the first annulus 24 relative to the reaction zone 13 inside the reaction chamber 12. This positive differential greatly improves safety and utility. In the event a pin-hole occurs in the noble metal liner and extends through the walls of the reaction chamber 12, inert gas from the annulus 24 will be forced from the higher pressure annulus 24 into the reaction chamber 12 thereby preventing the intrusion of highly corrosive reaction material into the annulus 24.

As aforementioned, in the case of conventional reactor designs (hot wall) for supercritical water oxidation, excessively long reactors of accordingly small diameter have been used. In such occasions, the reactor chamber serves also as the pressure vessel in contrast with the present invention. The high length/small diameter condition is translated to very small volume (of the reaction chamber) to surface area (of the walls of the reaction chamber) ratio, in contrast with the reactor of the present invention, wherein the respective volume to surface area ratio is manyfold higher for the same capacity reactor. Since an expensive protective coating, such as noble metal for example, is needed in either case to protect the reaction chamber walls, and since such a coating or liner should be preferably metallurgically bonded to the inside wall of the reactor for good support of the thin liner, it becomes evident that the reactor of the present invention presents a multiple advantage. First, due to the manyfold higher volume to surface area ratio for the reactor of the present invention, as described above, the cost for just material of the expensive protective liner is manyfold lower than the cost required by the conventional design. Second, the application of the liner on the wall having a manyfold wider diameter to provide a metallurgical bond is much easier. Third, the recovery for credit from the noble metal liner bonded to the reactor is much easier, due to the large inside diameter. Fourth, because, the adverse effects of pressure and temperature have been distributed and mostly separated so that the pressure acts mainly on the pressure vessel and the temperature acts mainly on the reactor, considerably higher temperatures and pressures may be safely utilized, as compared to those which may be safely applied in the case of conventional reactors. For example, pressures of 10,000 psia, and temperatures of 1,500° to 2,000° F. are possible according to the reactor of the present invention.

In turn, the higher pressures and temperatures allow:

the construction of considerably more compact reactors (10 to 100 times smaller reaction volume);

considerably lower volume of dilution water or dilute waste stream, because waste streams of more concentrated organics content may be utilized, since rise in temperature and pressure may be easily tolerated;

recovery of steam of higher value (steam at higher pressure and temperature); and safe handling of high temperature spikes, which may occur from time to time, due to either malfunction of the system or to other reasons.

It should be emphasized that the annulus 24 provides a critically important safety advantage over conventional hot-wall designs, which lack such a thermally insulating and chemically isolating annulus. Specifically, it provides opportunities for early warning of the intrusion of corrosive materials (from the reaction and/or transition zones) into the annulus. This is critical because the materials of construction of the pressure vessel (in both this invention and in conventional hot-wall vessel designs) cannot withstand the corrosive effects of acidic reaction byproducts. Early warning provides sufficient time to safely shut the system down and repair the source of the intrusion (e.g., a leak in a noble metal liner). In the case of a conventional hot-wall design, there is no such opportunity for early warning, and containment vessel failure may occur with disastrous results to personnel and equipment. Furthermore, in conventional hot-wall design, the pressure vessel wall runs at substantially higher temperature and is consequently much more susceptible to corrosive attack and vessel failure in the event a liner leak occurs.

It should also be noted, that in the case that the liner is not an expensive noble metal, such as for example in cases that the reactants and product of reaction are not corrosive, and they may be tolerated by inexpensive metals, the liner may be thick enough so as to by used as slide-in/slide-out addition to the reaction chamber, according to this invention. This is impossible with the reactors of the conventional type (hot wall reactors).

At the back end 20 of the reaction chamber 12, there is provided a disengagement vessel 38, which confines a transition zone 40. The pressure vessel 22, which surrounds the reaction chamber 12, is connected to the disengagement vessel 38 through a ring 42 having a first reverse L-shaped cross section in a manner that a first part 44 of the first reverse L-shaped ring 42 is restricted between the pressure vessel 22 and the disengagement vessel 38, while the second part 46 of the ring 42 forms a fluid discharge passage 48 with the reaction chamber 12. It also forms a cooling gap 50 with the disengagement vessel 38. The cross-section of the cooling gap 50 has a width of preferably in the range of ⅛" to ¾", and more preferably in the range of ¼"-½". Of course, depending on the characteristics of the reactor, this preference may change accordingly.

Within the cooling gap 50, there is preferably provided cooling portion 52, preferably in the form of a water dispenser providing a curtain or film of water 53 in a manner to cover the inner wall 54 of the disengagement vessel 38 during operation. The height of the cross section of the second part 46 of the ring 42 should be adequately large to maximize uniformity and stability of the water curtain 53. Although water spray may be used as cooling portion under certain conditions, in most occasions it is rather dangerous, since the surface area of the sprayed water, depending on droplet size, may change drastically, resulting in severe over-condensation or under-condensation of the supercritical fluid, followed by excessive pressure fluctuation in the reactor. Although the reverse L-shaped ring 42 may be cooled by the water passing through the cooling gap 50, conventional internal cooling (not shown) may also be used by circulating additional cooling water through veins inside the L-shaped ring.

Cooling and neutralization by the curtain of water film 53 is critical when reaction effluent contains corrosive materials. In addition, the water film 53 in the transition zone 40 serves to cushion the sloping walls of the walls 54 of the disengagement vessel 38 against erosion, which may occur in instances where reaction effluent contains abrasive solid particles. The water film also serves to dissolve water soluble particles (e.g., salts) in reaction effluent, thereby preventing plugging which might otherwise occur in downstream equipment with internal dimensions much smaller than that of the main reaction zone 13. The water film or curtain may be provided in different degrees of swerling or no swerling, by well known to the art techniques.

The fluid discharge passage 48 is preferably formed by providing a rough surface 56 to the second part 46 of the first reverse L-shaped ring 42, and designing the diameter D of the rough-surfaced second part 46 adequately larger than the diameter of the reaction chamber 12, so that when said reaction chamber 12 expands under operation conditions, a more or less snug fitting takes place between the reaction chamber 12 and the rough surface 56 of the second part 46 of the first reverse L-shaped ring 42. This arrangement compensates for higher expansion of the reaction chamber, which is subjected to higher temperature differentials, than the expansion of the pressure vessel, which is subjected to lower temperature variations. The thusly formed porosity allows a small amount of innocuous fluid to escape from the first annulus 24 to the transition zone 40, in a manner that the pressure within the annulus may be maintained considerably higher than the pressure in the reaction chamber, without an excessive amount of innocuous fluid escaping through the fluid discharge passage 48. The calculation of the different component expansions to form a more or less snug fitting during operation is simplified by the fact that the dimensions of the reverse L-shaped ring 42 at operation conditions remain substantially the same as at room temperature because of the cooling provided by the cooling portion 52. In addition, during the expansion period when the operation starts, as the lower part 56 of the reaction chamber 12 initially comes in contact with the cooled second part 46 of the first L-shaped ring, it also starts cooling, thus resisting further expansion. Since the cooling effect increases as the lower part 52 of the reaction chamber 12 tends to expand and form a better contact with the second part 46 of the ring 42, a self-corrective action takes place which tends to normalize the fluid discharge passage 48.

The disengagement vessel 38 is also connected to an end tube 60, wherein full mixing and cooling of the water 53, and effluent gases and reaction products occur, due to considerable turbulence caused by the cooling and the drastic decrease in diameter.

When the products of oxidation in the reactor are acidic, such as containing for example HCl, $H_2SO_4$, and the like, it is desirable to use one or more additive entries for adding additives, such as hydroxides or carbonates of the alkali metals for example, in order to neutralize said acids. The entries used to provide some or all basic additives may be located at the front end 18 of the reaction chamber 12 so that said additives are introduced through one or more of the reactant entries, such as reactant entry 30, for example. Since, however, even alkali salts may be insoluble under water supercritical conditions and be deposited on the inside wall 14 of the reaction chamber 12, it becomes critical in most occasions to introduce some or all such basic additives in the vicinity of the cooling portion, where the supercritical conditions cease to exist. As a matter of fact it is highly preferable that the additive entries are combined together with the cooling portion, so that the additives have been premixed with the cooling water which forms the curtain or film 53 on the inner wall 54 of the disengagement vessel 38.

Examples of calculated nominal dimensions of the vital components of the reactor as related to the dominating conditions are given hereinbelow.

For constant
  Pressure vessel inside diameter: 24"
  Wall thickness of pressure vessel: 3.5"
  Reaction Chamber inside diameter: 19"
  Pressure inside reaction chamber: 4,000 psia
  Pressure in first annulus: 4,040 psia
  Thickness of ceramic paper insulation: ¼"
  Number of radiant shields: 2
  Content of organics in waste stream (wt.): 5–7%
  Pressure vessel material of construction: High strength low alloy steel plate, and/or forging

EXAMPLE 1

Temperature inside reaction chamber: 1,100° F.
Wall temperature of pressure vessel: <600° F.
Flow of waste stream: 30 gallons per minute
Reaction Length: 19 ft.
Reaction Time: 45 sec.

EXAMPLE 2

Temperature inside reaction chamber: 1,100° F.
Wall temperature of pressure vessel: <600° F.
Flow of waste stream: 60 gallons per minute
Reaction Length: 38 ft.
Reaction Time: 45 sec.

EXAMPLE 3

Temperature inside reaction chamber: 1,300° F.
Wall temperature of pressure vessel: <600° F.
Flow of waste stream: 74 gallons per minute
Reaction Length: 19 ft.
Reaction Time: 15 sec.

EXAMPLE 4

Temperature inside reaction chamber: 1,300° F.
Wall temperature of pressure vessel: <600° F.
Flow of waste stream: 100 gallons per minute
Reaction Length: 26 ft.
Reaction Time: 15 sec.

Figure 2:
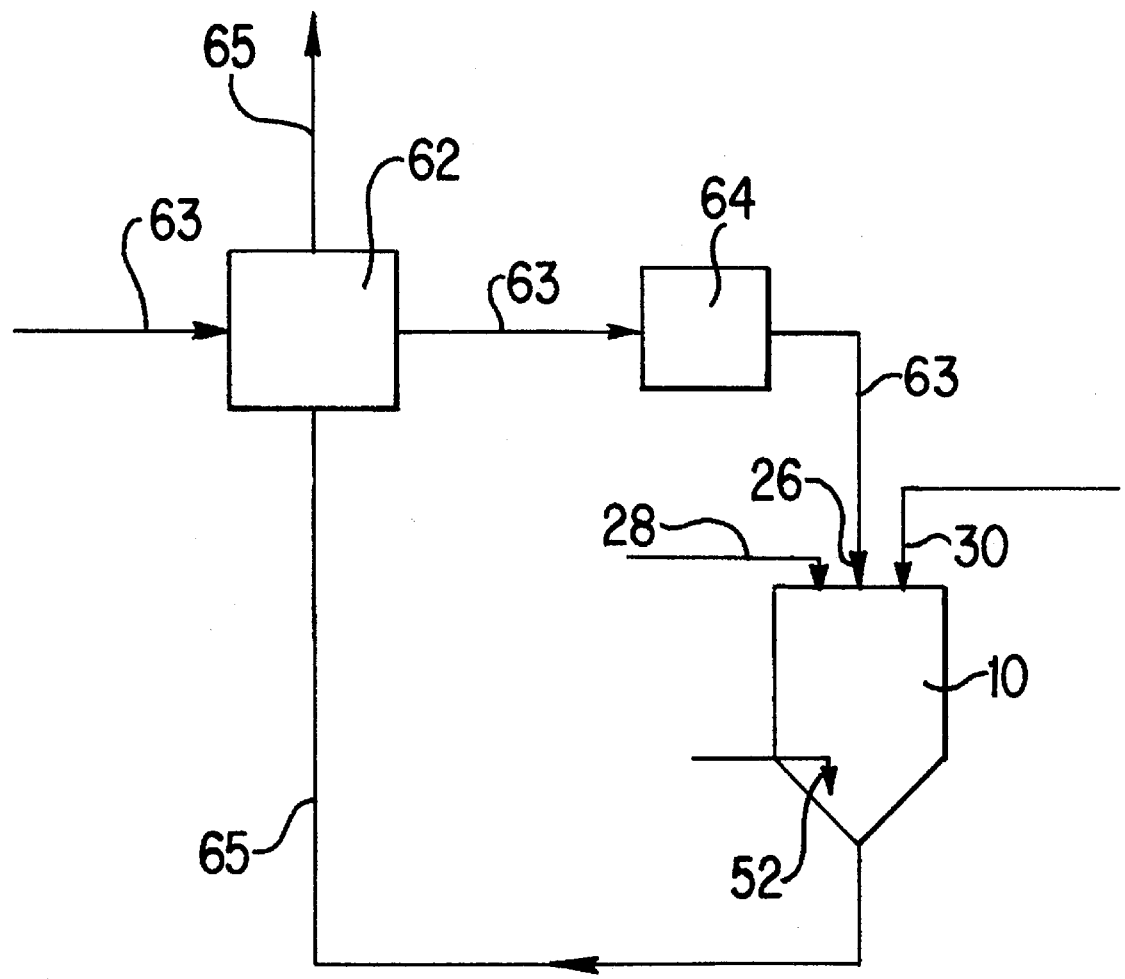
FIG. 2 shows a simplified schematic diagram of a system including a reactor according to the present invention for treating waste.

In order to better describe the operation of the reactor of the above embodiment, a simplified block diagram is shown in FIG. 2, which includes a heat exchanger 62 and a heater 64. Details of the total system and its operation, excluding the reactor of the present invention, are well known to the art and are described in the aforementioned patent literature.

Considering now FIGS. 1 and 2, the operation of a system utilizing the reactor of the present invention may be briefly described so that in a following detailed description, the operation of the reactor itself may be better understood.

When the system is to start, a waste feed is pumped through the heat exchanger 62 and heater 64 through feed path 63, and enters the reactor 10 through reactant entry 26, preferably at or just under supercritical conditions. However, entry at considerably lower temperatures is within the realm of this invention, as long as supercritical conditions prevail at some region of the reaction zone 13. At this point, the heat exchanger does not offer any heating to the waste feed, and therefore, the heater 64 has to operate at considerably higher energy consumption. The heater 64 is preferably a gas heater. Oxygen is also fed through reactant entry 28, and neutralization additives are added either through reactant entry 30 or through cooling portion 52, or through both, as already mentioned. When the oxygen is mixed with the waste feed, inside the reactor 10, the organics are oxidized, the reaction products are neutralized if necessary, and the effluent gases, being mixed with any other constituents of the reaction products, are subjected to a preliminary cooling by the water film or curtain 53 within the transition zone 40 and by the turbulent environment of the end-tube 60. The preliminarily cooled products are in turn fed through exit path 65 and through the other side of the heat exchanger 62, in order to be properly disposed of. As the reaction proceeds, the consumption of energy in the heater 64 becomes lower, due to the heat interchange in the heat exchanger 62, until a steady state is reached.

Coming now to the operation of the reactor 10 itself, as shown in FIG. 1, waste feed containing organic matter is introduced to the reaction chamber 10 through reactant entry 26, and an oxygen containing gas, such as air or preferably plain oxygen for example, is caused to enter the reactor chamber in a preferably stoichiometric amount or slightly higher, with respect to the requirement of fully oxidizing all the organic matter in the waste. If there is chlorine, sulfur, or other compounds which produce acids when oxidized under the water supercritical conditions, neutralization additives, such as alkali hydroxides or carbonates and the like are added to the system through any reactant entry, such as reactant entry 30 for example. Since, however as aforementioned, even alkali salts may be insoluble under water supercritical conditions and be deposited on the inside wall 14 of the reaction chamber 12, it becomes critical in most occasions to introduce some or all such basic additives in the vicinity of the cooling portion, where the supercritical conditions cease to exist. Therefore, it is highly preferable that the additive entries and the cooling portion 52 are combined together, so that the additives have been premixed with the cooling water which forms the curtain or film 53 on the inner wall 54 of the disengagement vessel 38. In this case it is also critical that the inside wall 14 of the reaction chamber 12 be protected by a coating or liner, such as for example a noble metal.

At the same time as the oxidative and neutralization reactions are taking place under water supercritical conditions in the reaction chamber 12, an innocuous fluid, such as an inert gas including but not limited to nitrogen, argon, helium, and the like, for example, is introduced into the first annulus 24 through valve 36, and it is maintained at a pressure of preferably 2–200 psia, more preferably 20–80 psia, even more preferably 30–60 psia, and even more preferably 35–45 psia higher than the pressure in the reaction chamber. A reasonably small amount of inert gas is passing during the operation through the fluid discharge passage 48 into the transition zone 40. The higher pressure in the first annulus 24 isolates the pressure vessel 22 from the harsh environment of the reaction chamber 12, and ensures that no hot and reactive gases come in contact with the pressure vessel 22.

The thermal insulators 32 and 34 ensure that the pressure vessel 22 is not subjected to the high temperatures which exist during operation within the reaction chamber 12.

As aforementioned, both the chemical isolation and thermal insulation of the pressure vessel 22 from the conditions existing in the reaction chamber 12 are of critical importance as far as the present invention is concerned. It may now be seen more clearly that according to the present invention, the adverse conditions in the reactor are shared in a manner that the reactor chamber is subjected to a corrosive and hot environment, with little pressure differential between its outside and inside walls, 16 and 14, respectively, while the pressure vessel is subjected to considerably lower temperatures outside the corrosive environment, so that it can withstand high pressure differentials with a reasonable wall thickness. The material of construction may also be of less expensive nature. For example, stainless steel or even carbon steel may be used instead of expensive alloys, such as Inconel, for example.

As aforementioned, the cooling portion 52 provides a film or curtain of water 53 on the inside wall 54 of the disengagement vessel 38. This may be done preferably either by a straight water injection in a downwardly direction (toward the end-tube 60), or by a swirl-like discharge on the wall 54 of the disengagement vessel 38. In any event, the water curtain 53 cools the disengagement vessel 38, so that inexpensive construction materials also may be used for its construction. The water curtain also provides a cushion which prevents erosion of the transition walls due to solid abrasives, which may be present in the reaction chamber effluent. In addition, The water curtain or film 53 starts cooling down the reaction products and effluent gases coming from the reaction chamber 12 to the transition zone 40. Further cooling of the reaction products and effluent gases, and mixing with the water as well as the neutralization additives, if present, takes place in the vicinity of the junction of the disengagement vessel 38 and the end-tube 60, where extensive turbulence dominates. In sequence, the lower temperature oxidation products exit the reactor 10 and follow the exit line 65 (FIG. 2) as previously discussed.

Figure 3:
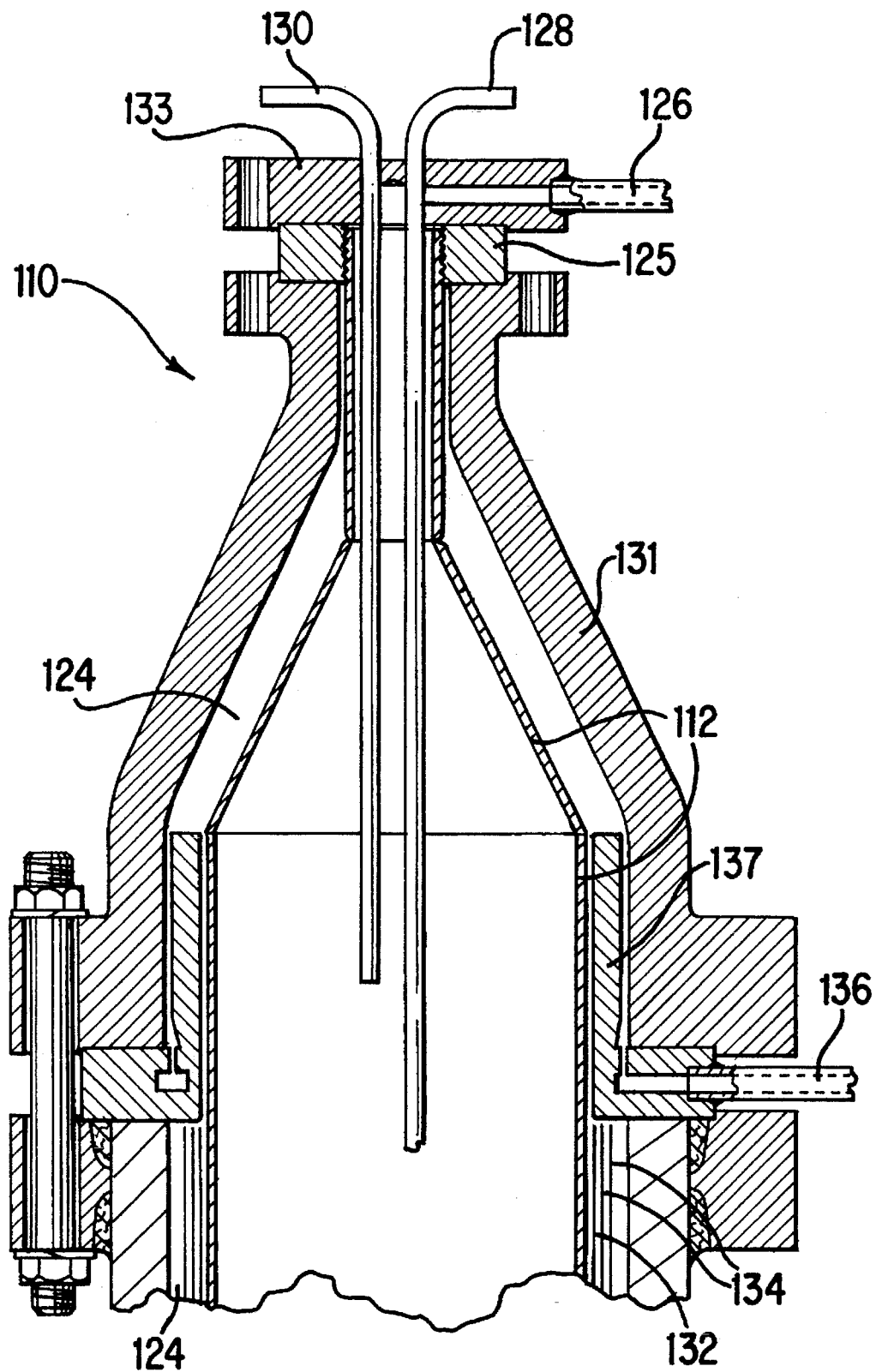
FIG. 3 shows a fragmental cross-sectional schematic diagram of a reactor according to a different preferred embodiment of the present invention, wherein at least some of the reactant entry is extended into reaction chamber.

In a different embodiment of the present invention, better illustrated in FIG. 3, the head 131 of the reactor 110 has a conical shape, while at least some of the reactant entry, such as for example 128 (for oxygen bearing gas) and 130 (for neutralizer, if so desired) extend within the reaction chamber 112. The waste stream in this particular embodiment is fed to the reactor through reactant entry 126. The valve 136 is connected to a second L-shaped ring for providing innocuous fluid to the first annulus 124. The reaction chamber 112 is threadably connected to a first flange 125, which in turn is compressed between the head 131 and the flat part 133. Other ways well known to the art, of connecting the reaction chamber 112 to the first flange 125, however, may be also used.

The operation of this embodiment is substantially the same as the previous one, and therefore it requires no additional explanations.

Figure 4:
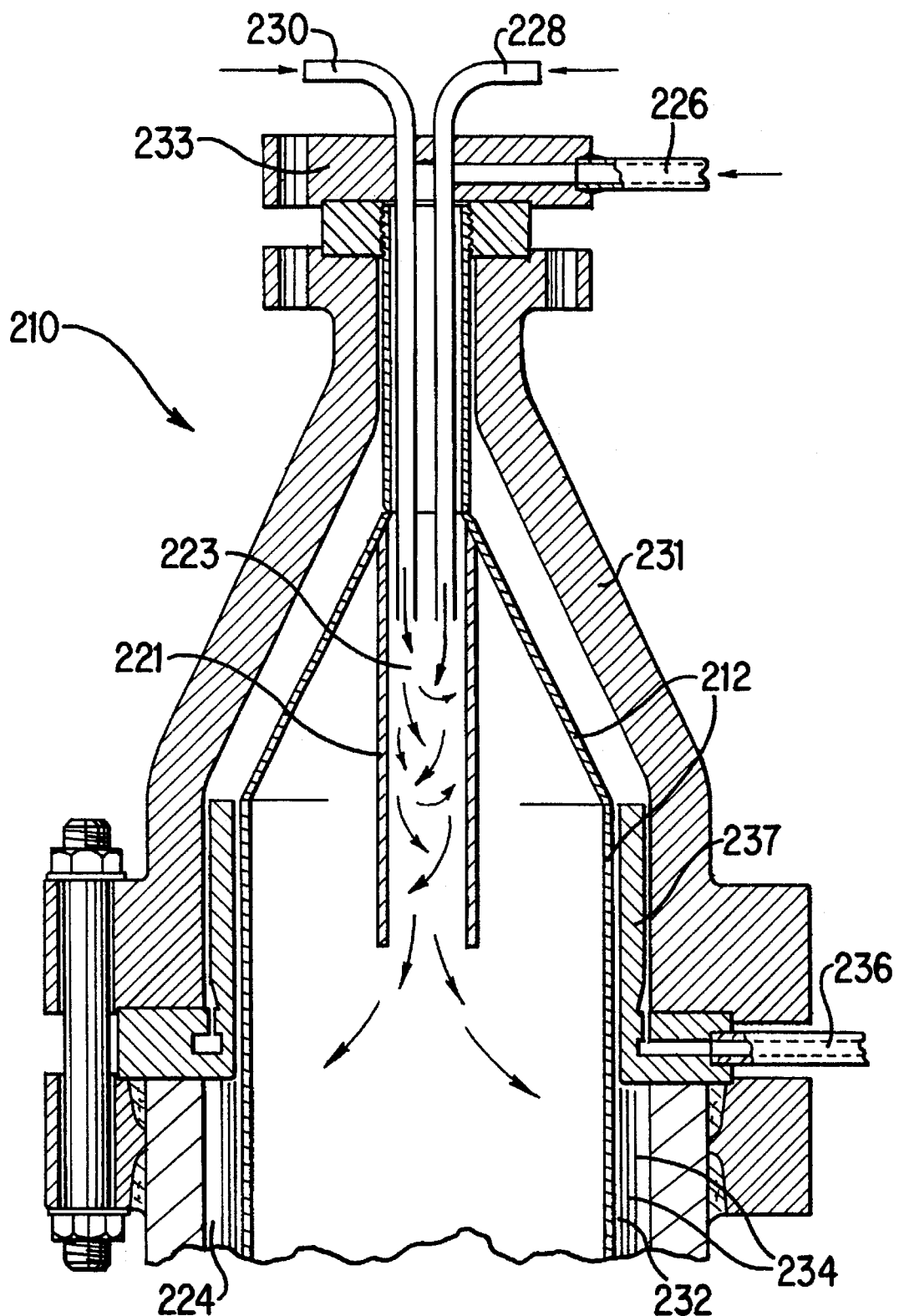
FIG. 4 shows a fragmental cross-sectional schematic diagram of a reactor according to a different preferred embodiment of the present invention, wherein the reactant entry communicates with a premixing chamber for the reactants to be intermixed and partially- or pre-oxidized before their entrance to the reaction chamber.

In still another embodiment of the present invention, better illustrated in FIG. 4, there is also provided a premixing chamber 221, which confines a premixing zone 223. The rest of the elements are substantially the same as in the embodiment illustrated in FIG. 3. In the premixing zone 223, the oxygen bearing gas, which of course may be simply oxygen, enters through reactant entry 228. Waste is also fed through reactant entry 226. Neutralizer may enter through reactant entry 230, if so desired, or it may enter the system at a later stage, such as for example the transition zone (not shown in FIG. 4), as described for the embodiment illustrated in FIG. 1. The neutralizer may also be mixed in the waste stream, which might eliminate reactant entry 230, if no other additives are to be fed to the system through a separate route. In any event, the reactants (waste and oxygen) are well mixed and pre-reacted in the premixing zone 223, before they enter the reaction chamber 212. The premixing, which involves pre-reaction of the waste stream with the oxidant, as aforementioned, is essential for preventing partially oxidized products from exiting the reactor. One of the purposes of the premixing/pre-reaction is to lower the density of the mixture, so that plug flow is maintained in the reaction zone. The initial mixture at the beginning of the premixing zone 223, and before any reaction takes place may be, for example, 19 lbs/ft$^3$, while the fully reacted product at the exit of the reaction chamber, may be about 5 lbs/ft$^3$. This is a very large difference in density, which results in a tendency to shoot the unreacted mixture to the exit of the reaction chamber directly through the main reaction zone 213, without allowing it a chance to react. Thus, pre-reaction in the premixing zone is important for lowering the density of the mixture to preferably somewhere in the middle range, such as 10–12 lbs/ft$^3$ in the example given above. To achieve such a result, the reaction should preferably be allowed to proceed by about 20–40% in the premixing chamber 221. Hold up time in the premixing chamber 221 is preferably 0.1 to 4 seconds, and more preferably 0.5 to 1 second. The ratio of the diameter of the premixing chamber 221 to that of the main reaction chamber 212 around the reaction zone 213 is less than or equal to 1 to 2, preferably it is 1 to 3, and more preferably it is 1 to 5. However, it may be any ratio in the range of 1 to 2, to 1 to 20. The length of the premixing chamber is such as to satisfy the above mentioned requirements.

In addition to other advantages, the premixing, which involves pre-reaction of the reactants in the premixing zone 223, promotes faster reaction, and therefore, helps in maintaining the length and/or diameter of the reactor 210 shorter.

Except for the additional premixing step, the operation of this embodiment is substantially the same as the previous embodiments, and therefore it requires no additional explanations.

Figure 9:
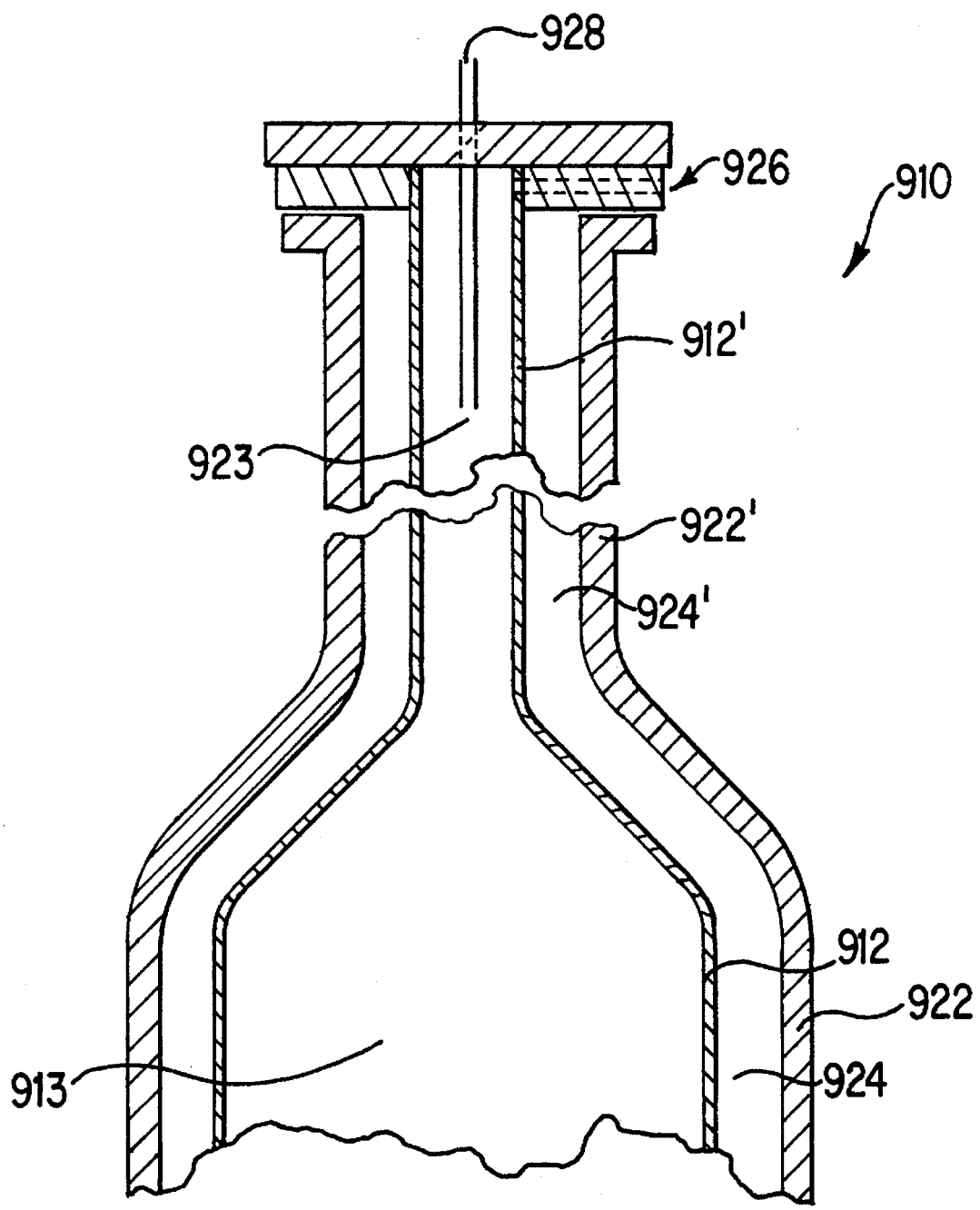
FIG. 9 illustrates schematically a different embodiment of the present invention, wherein upward extensions with smaller diameters of the reaction chamber and the pressure vessel are used for better intermixing and reaction of the waste with oxygen.

In another similar embodiment of this invention, better shown in FIG. 9, reactant pre-mixing and/or pre-oxidation is achieved by modifying the design of the inlet of the reactor 910 to allow for a longer run of small diameter inlet pipe. In this instance, the reactants are mixed inside an upward extension 912' of the reaction chamber 912 into this extended zone (typical dimension is 4 inches inner diameter) 923. This upward extension 912' transitions at its downstream end into the reaction chamber 912. A typical length of the upward extension 912' is 4 to 7 feet. Of course, the length may be shorter or longer. Although in FIG. 9, the reactor 922 and the reaction chamber 912 are shown as monolithic entities with their respective upward extensions 922' and 912', they may be in practice two or more separate parts, bolted, or welded, or otherwise connected together. The smaller diameter portion or upward extension 912' should preferably also be thermally insulated, although it is not shown in FIG. 9 for purposes of clarity.

The importance of the upward extension 912' is to efficiently disperse oxygen feed gas into the waste stream required for complete, efficient waste destruction in the reaction chamber, and to promote partial oxidation reaction. In turn, the purpose of pre-oxidation reaction is to convert lower temperature, possibly two-phase feeds, to higher temperature, lower density single phase feed. Single phase feed at system pressure is to be achieved by raising bulk stream temperatures above the supercritical point by way of partial, pre-oxidation. Products from the upward extension 912' are to be subsequently introduced into the main oxidation reaction chamber 912, where the remainder of the waste destruction reaction is to occur. An important purpose of the upward extension 912' is to insure the maintenance of highly desirable plug-flow reaction in the main oxidation chamber 912 by converting any two-phase flow exit the gas heater to single phase feed, and by minimizing density differences between feed and end product from the main reaction zone 913. Because two-phase feeds can be converted to higher temperature, single-phase feed in the upward extension 912', this embodiment of the invention serves to also minimize preheating requirements, thereby facilitating operating cost and equipment investment reduction.

The first annulus 924 and its upward extension 924' preferably comprise similar thermal insulation and chemical isolation elements (not shown for purposes of clarity) as described in other embodiments of this invention. Each of these elements may be monolithic within the annulus 924 and its extension 924' or they may be disposed as two or more separate entities each. Since both extensions 912' and 922' have considerably smaller diameter than their respective reaction chamber 912 and reactor 922, the upward annulus extension 924' may be eliminated in some occasions which are not very demanding.

There are also provided reactant entry 928 for oxygen and reactant entry 926 for waste.

The operation of the reactor of this embodiment is similar to the operation of the reactors of the other embodiments described herein, except that the waste and oxygen are better mixed and pre-reacted in the small diameter upward reaction chamber extension 912', where the concentrations of the reactants are necessarily considerably higher, and therefore supercritical water conditions may be achieved more easily, and in a more uniform manner.

Figure 5:
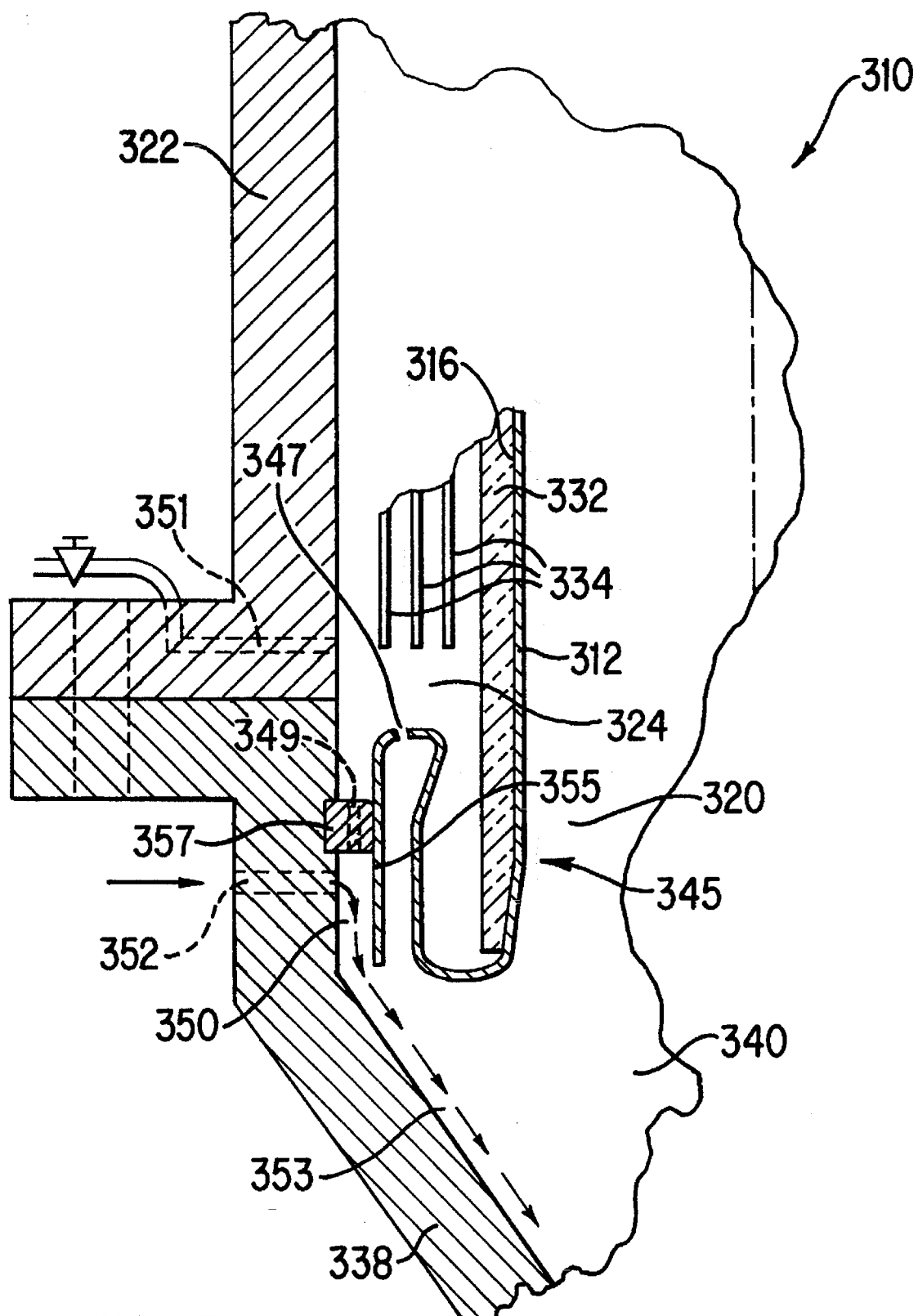
FIG. 5 shows a fragmental cross-sectional schematic diagram of a reactor according to a different preferred embodiment of the present invention, wherein there is provided a corrosion detector in the form of a sampling port, and wherein the fluid discharge passage is located in the vicinity of the back end of the reaction chamber, which has a sigma shaped cross section.

In a different embodiment of this invention, better illustrated in FIG. 5, there is depicted a fragmental cross-sectional view of the reactor 310, wherein the walls of the reaction chamber 312, at the back end 320 have a sigma-shaped cross section 345, the outer face 355 of which is pressing against seal 357 during operation, so as to substantially leave no gap between the outer face 355 and the seal 357. The sigma-shaped cross-section 345 may have one or more small holes 347 to be used as a fluid discharge passage from the first annulus 324 to the transition zone 340. One or more holes 349 may also be present on the seal 357 for the same purpose. These passage holes 347 and 349 may be in either one or the other or both parts. The holes have to be adequately small so that a higher pressure is kept in the annulus as compared to the pressure in the reaction chamber 312, without an excessive amount of innocuous fluid escaping through the holes. In this embodiment, there is also provided a foreign gas detector in the form of a port 351, through which samples of the fluid in the annulus may be taken and analyzed either continuously or periodically. Foreign gases for the annulus are those gases which may leak into the annulus from the reaction chamber 312 or the transition zone 340. Such leakage may for example occur either from the fluid discharge passage (holes 347 and/or 349) or through pinholes formed because of corrosive or other defects developed through the walls of the reaction chamber 312. The early detection of corrosive gases in the annulus is of high importance because they may deteriorate the strength of the pressure vessel 322, as well as the radiant shields 334, the insulation 332 and the reaction chamber 312 through its outside wall 316.

Figure 10A:
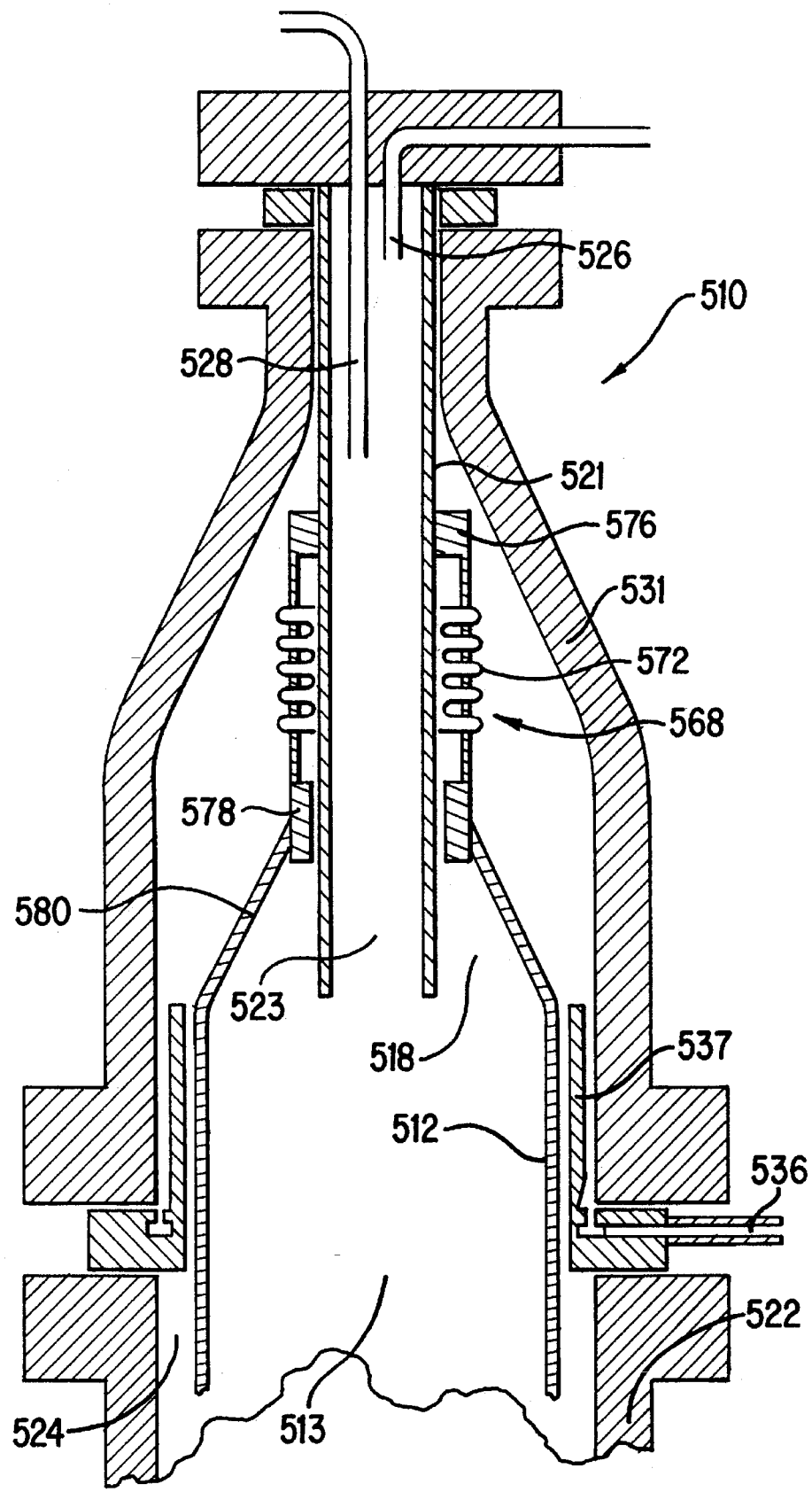
FIG. 10a shows a fragmental cross-sectional schematic diagram of a reactor according to a different preferred embodiment of the present invention, wherein a longitudinal expansion joint in the form of a bellows is used.
Figure 10B:
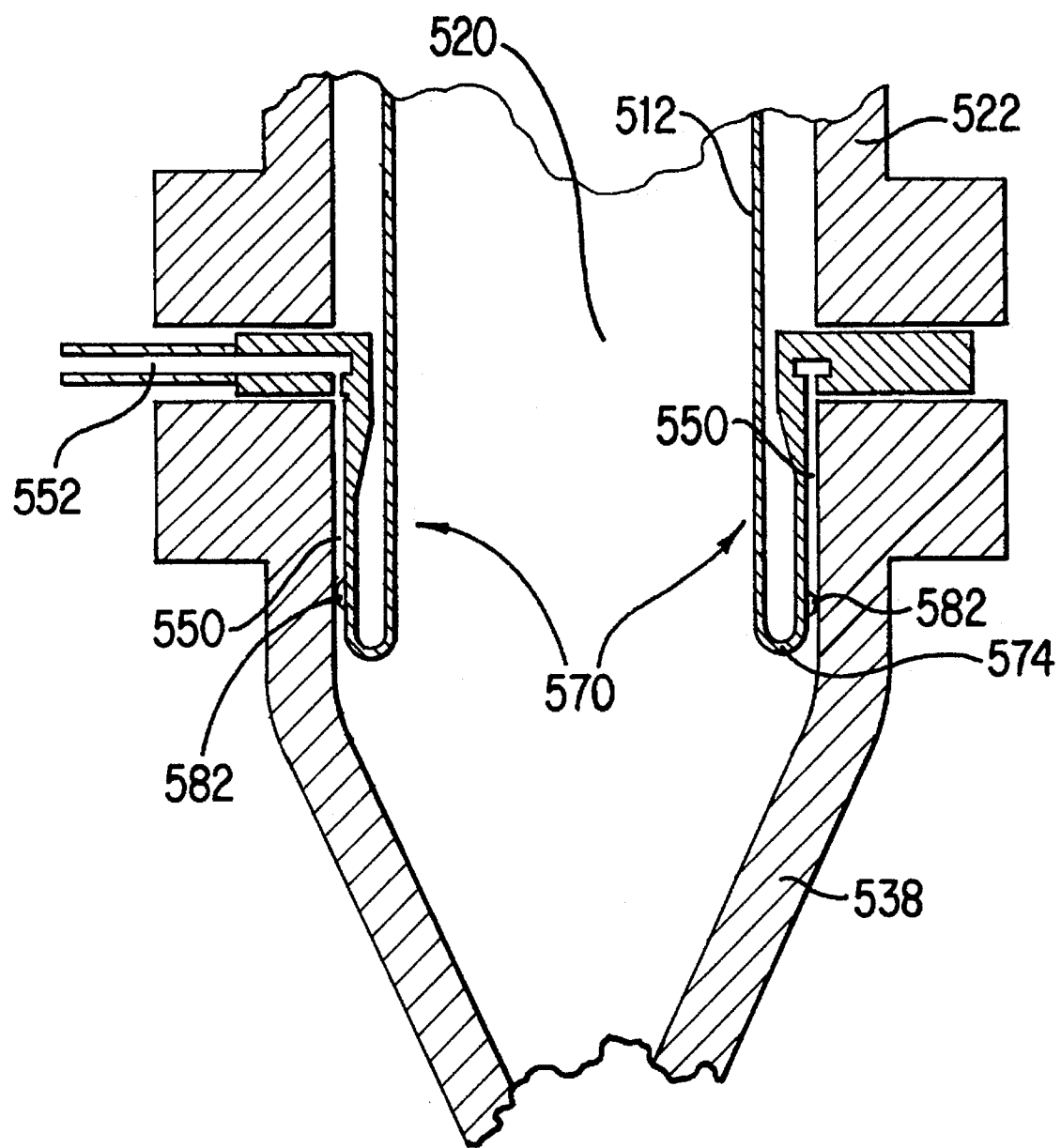
FIG. 10b shows a fragmental cross-sectional schematic diagram of a reactor according to a different preferred embodiment of the present invention, wherein a radial expansion joint is used.

Other types of detectors include, but are not limited to thermocouples (not shown) in different positions of the first annulus to detect abnormal temperature changes, and to easily corrodible thin alarm wire placed within the annulus for measuring its conductivity and/or continuity, as better illustrated in FIGS. 7 and 8. As the alarm wire is being corroded, its conductivity will be decreasing until the continuity is interrupted. Interruption of continuity is, however, more reliable than mere decrease in conductivity, which decrease may also be caused by reasons different than corrosion. Appreciable decrease in conductivity may give a preliminary warning that something may be going wrong, and interruption may be expected soon. The alarm wire (or multiple wires) is to be electrically isolated from other metal surfaces. It may be applied to the outside of the reaction chamber or to the inside and/or outside of the radiant shields. The wire may be wound in a single spiral or in two or more overlapping spirals so as to provide virtually complete coverage of all parts of the reaction chamber, thereby enabling the immediate detection and early warning of an intrusion of corrosive reaction materials into the first annulus. In the case of complete physical isolation between the annulus and the reaction zone, such as shown in the embodiment of FIGS. 10a and 10b, drop of the pressure in the annulus is indicative of creation of communication (pinholes, and the like) between the annulus and the reaction zone.

FIG. 7 illustrates schematically a first spiral arrangement of an alarm wire 635 within the first annulus 624 and around the reaction chamber 612. The rest of the elements of the reactor are not shown for purposes of clarity. As aforementioned, the alarm wire 635 is electrically isolated from all other metal surfaces, and it may be applied around the outside wall 616 of the reaction chamber 612, under, over, or within the ceramic fiber thermal insulator (not shown here, but illustrated as 32 in FIG. 1) or it may be applied within the space defined by any two radiant shields, or in the space defined by one shield (denoted as 34 in FIG. 1) and pressure vessel (denoted as 22 in FIG. 1 ). It is preferable that the alarm wire is located between one radiant shield and the adjacent ceramic fiber thermal insulator, for fastest response. A serious reason why it is critical to have a pressurized inert gas in the first annulus and not any other more or less reactive gas, such as water vapor, for example, is that such a more or less reactive gas would result sooner or later in corrosion of the alarm wire, thus causing false alarm. Of course, corrosion of other metal and/or ceramic elements of the reactor within the first annulus would also suffer from corrosion in the presence of such more or less reactive gases.

The alarm wire 635 in this embodiment may have two leads 635a and 635b, which leads are electrically insulated and communicate with the outside of the reactor by well known techniques to the artisans. However, the alarm wire 635 may also be provided with one or more auxiliary leads, such as for example auxiliary leads 635c and 635d, so that a better determination of the position of corrosion on the alarm wire 635 may be determined, and therefore, the location of possible leakage of corrosive gases may also be better determined.

The alarm wire 635 may be wound in many spiral turns, as shown in FIG. 7, or it may wound in one spiral turn, two overlapping interconnected or independent spiral turns, as aforementioned, and the like. More than one alarm wires may be used, preferably in an overlapping manner within the first annulus, around one or more elements residing within said annulus.

The operation of the reactor of this embodiment is similar to the operation of the embodiments described thus far, with the difference that if a leakage of corrosive gases into the first annulus occurs, the conductivity of the alarm wire 635 starts decreasing with final complete interruption of the circuit which has said alarm wire electrically connected, preferably in series. Loss of a certain percentage of conductivity, preferably greater than 10%, more preferably more than 50% and even more preferably 100% (complete interruption of the circuit) acts in a way to protect the safety of the operator and the reactor integrity. For example it may give an alarm to the operator, so that the operator may take appropriate precautions, depending on the particular circumstances. In another example, it may shut off the operation totally or partially, or it may cause other actions, which would be beneficial to the safety of the operator and the integrity of the reactor.

In still a different embodiment of the present invention, the alarm wire 735 is wound in a manner better illustrated in FIG. 8. This alarm wire has also two leads 735a and 735b. Except for the different manner that wire 735 is wound the operation of the reactor the detection system is the same as in the previous embodiment.

With any type of detector, a warning may be given to the operator, such as for example alarm, automatic shut-off of the system, and the like, as described above.

Figure 6:
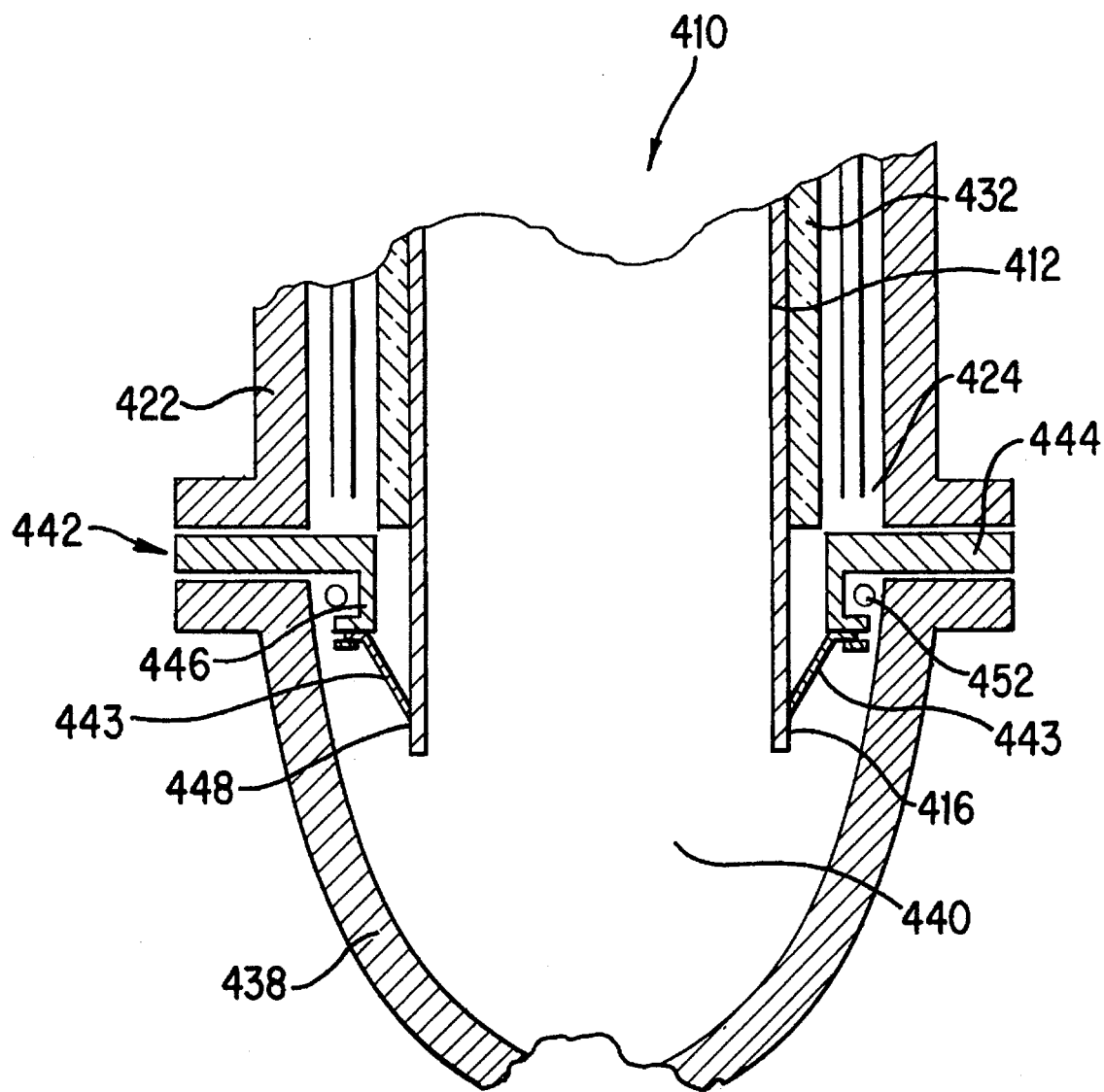
FIG. 6 shows a fragmental cross-sectional schematic diagram of a reactor according to a different preferred embodiment of the present invention, wherein a cone-like ring is used for the formation of the innocuous fluid discharge passage.

In another embodiment of this invention, better shown in FIG. 6 as a fragmental cross-sectional view of the reactor 410, the fluid discharge passage 448 is formed by a rather thin cone-like ring 443, which during operation is capable of sliding on one side over the outside surface 416 of the reaction chamber 412, and it is supported at the other side by the second part 446 of the Reverse L-shaped ring 442. Due to the pressure differential between the first annulus 424 and the transition zone 440, innocuous fluid escapes through the fluid discharge passage 448. It is also possible to use a tighter fit of the cone-like ring over the outside surface 416 of the reaction chamber 412, in which case one or more small holes (not shown) may be opened on the ring 443; alternatively, one ore more slots may be opened at the contact area between the ring and the surface 416.

The operation of this embodiment is substantially the same as the previous embodiments, and therefore it requires no further explanations.

In still another embodiment of the present invention, the holes 347 and 349 (FIG. 5) may be eliminated and a pressure relief valve or check valve be installed in place of hole 349, or in any other suitable position. For example, a pressure relief valve may be installed in external piping discharging from the annulus into the disengagement vessel. Provision for rapid depressurization of the annulus is critical to prevent destructive deformation of the reaction chamber in the event of a rapid depressurization of the reaction chamber, and thus the relief or check valve (not shown) should be adequately fast acting. A person of ordinary skill in the art is able to select the appropriate valve depending on the dimensions, materials of construction, and conditions within the different elements of the reactor.

In many of the above embodiments there is physical communication between the annulus and the reaction or transition zone. However, due to the higher pressure maintained in the annulus, there is chemical isolation between the two regions. By chemical isolation, it is meant that reactive gases from the reaction or transition zone cannot enter the annulus and react with any elements within the annulus, including the surfaces forming said annulus. The physical communication is mainly dictated by the fact that in operation of the reactor, contraction and expansion of the reaction chamber (among other elements) occurs, depending on the prevailing temperature. This expansion and contraction is much higher fo the reaction chamber, which is subjected to higher temperature variations, than the pressure vessel, which is subjected to considerably lower temperature variations. A mechanism, such as a gap for example, is used to accept the size changes caused by the contraction and expansion of the reaction chamber. In a number of occasions, it is preferable that the two types of regions (the reaction or transition zone and the annulus) are not only chemically isolated, but also physically isolated from each other. This precludes physical communication between the two, even in the absence of pressure differential. The following embodiments achieve this objective and they use elements adaptable to compensate for the size differentials during the operation of the reaction chamber. However, it should be understood that a relief valve, as aforedescribed, should preferably be included between the annulus and the reaction or disengagement zone in order to avoid catastrophic failure in case there is creation of excessive pressure in either annulus or loss of pressure in the reaction chamber. Under such circumstances, the abrupt pressure variation may be easily detected by continuously monitoring the pressure in both regions.

FIGS. 10a and 10b represent a preferred embodiment of the instant invention, wherein there is no physical communication between the annulus and the reaction zone, and at the same time there is compensation for size differentials of the reaction chamber. Although most of the elements of the reactor are subjects to expansion and contraction during temperature variations, the size variations of the reaction chamber are of most importance in the context of this and the rest of the embodiments described hereinbelow.

According to this embodiment, the reactor 510 comprises a longitudinal expansion joint 568 and a radial expansion joint 570. Both joints are connected to the reaction chamber 512, and they isolate the reaction zone 513 from the first annulus 524. In this particular occasion, the longitudinal expansion joint 568 has the form of a bellows 572, and the radial expansion joint 570 has the form of U in its cross section 574. The bellows has an upper end 576 and a lower end 578.

Preferably, the longitudinal expansion joint 568 is disposed closer to the front end 518 of the reaction chamber 512, and the radial expansion joint 570 is disposed closer to the back end 520 of the reaction chamber 512.

The reactor 510 may also comprise a premixing chamber 521 of reduced diameter as compared to the diameter of the reaction chamber 512. The premixing chamber 521 surrounds the reactant entries 526 for waste water and 528 for oxidant, so that the reactants are mixed in premixing zone 523 before entering the reaction zone 513. The upper end 576 of the bellows 572 is hermetically connected to the premixing chamber 521, and the lower end 578 is hermetically connected to front end wall 580 of the reaction chamber 512.

At the back end 520 of the reaction chamber 512, said reaction chamber is connected to (in this particular case it is part of) the U-shaped 574 radial expansion joint 570. The cooling portion 552 provides a coolant, which is preferably water, to pass through cooling gap 550 and cool the disengagement vessel 538. A number of spacers 582 between the wall of the disengagement vessel 538 and the proximal leg 584 of the U-shaped 574 radial expansion joint 570 are attached on one or the other or both sides in order to prevent closing of the cooling gap 550.

In order to minimize stresses on the bellows 572, it is preferred that the bellows or other longitudinal expansion joint 568 has a reduced diameter as compared to the diameter of the reaction chamber 512.

It is preferable that the longitudinal expansion joint is kept as cool as possible. One way is to place temperature resistant insulation (not shown) between the expansion joint 568 and the premixing chamber 521. It is also preferable to introduce into the bellows 572 an inert gas (not shown for purposes of clarity) at a pressure higher than the pressure in the reaction chamber 512, so that inert gas flows from the inside of the bellows to the reaction zone 513 through a gap formed between the lower end 578 of the bellows 572 and the premixing chamber 521.

The operation of this embodiment is similar to the operation of the previous embodiments with the difference that when the temperature is raised to operating conditions, and the reaction chamber expands, the upper end 576 of the bellows 572 remains in position, while the lower end 578 is pushed toward the upper end 576 by the back end wall 580 of the reaction chamber 512. The bellows, of course, shrinks accordingly, without the need of physical communication between the reaction chamber and the annulus. The lower end 578, which surrounds the premixing chamber 521 has a larger diameter than the diameter of the premixing chamber 521, and therefore it moves freely in a longitudinal direction with said premixing chamber.

As the temperature increases, in addition to the longitudinal expansion, radial expansion also is observed on the reaction chamber 512. This is absorbed by the U-shaped 574 radial expansion joint 570, which is capable to deform reversibly due to its structural configuration as better shown in FIG. 10b. The spacers 582 do not allow closing of the cooling gap 550.

Figure 11:
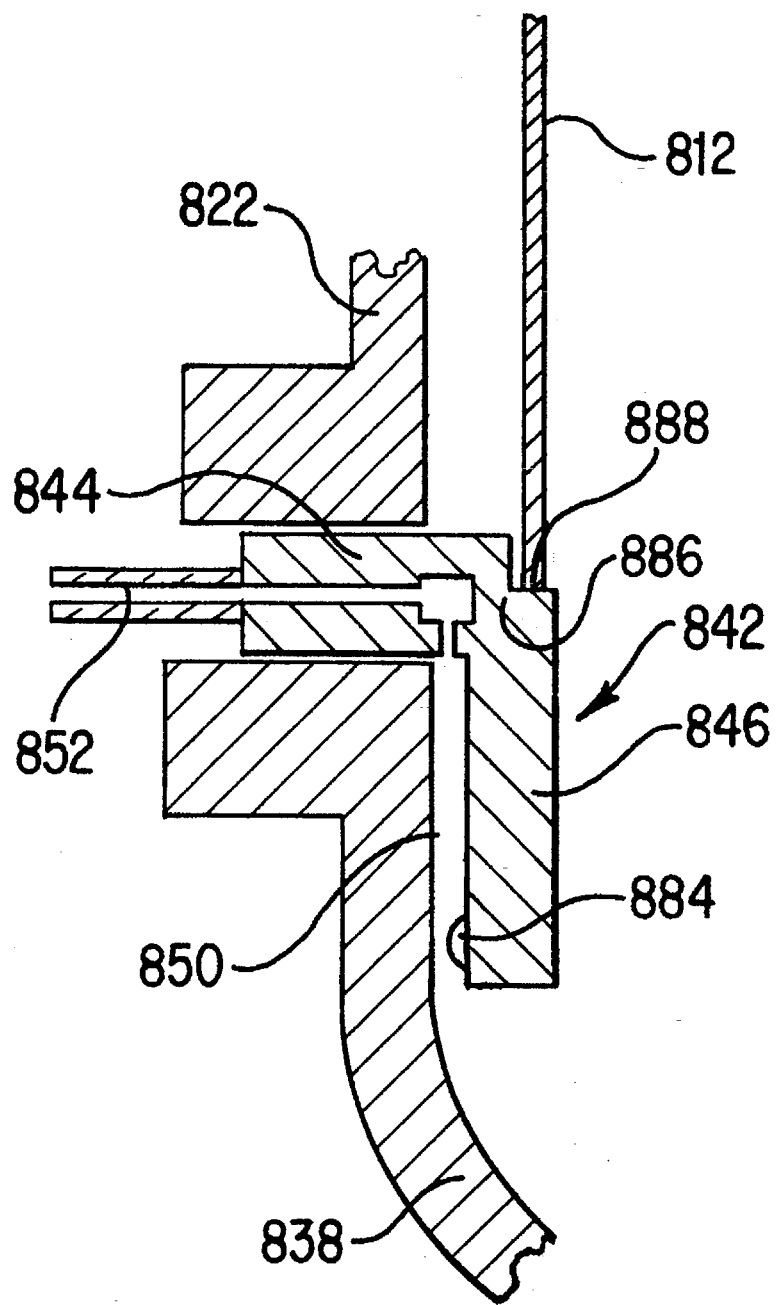
FIG. 11 shows a fragmental cross-sectional schematic diagram of a reactor according to another preferred embodiment of the present invention, wherein a different type of radial expansion joint is used.

In a different embodiment, better shown in FIG. 11, the pressure vessel 822 and the disengagement vessel 838 are connected through a ring 842 having a reverse L-shaped cross section, in a manner that a first part 844 of the ring 842 is restricted between the pressure vessel 822 and the disengagement vessel 838, and a second part 846 of the ring 842 forms a cooling gap 850 with the disengagement vessel 838, as also described in previous embodiments. The ring 842 has a notch thimble 886, on which notch thimble, the edge 888 back end of the reaction chamber 812 nests. It is preferable that the edge 888 of the back end of the reaction chamber 812 is hermetically connected or sealed on the ring, preferably at the position it nests on the notch thimble 886.

Any techniques well known to the art may be used for the hermetic connection or sealing. Examples of these techniques include but are not limited to welding, spot welding, press fitting, and the like. The diameters of the notch thimble 886 and the reaction chamber 812 may be selected such that when the temperature is raised during operation, the diameter of the reaction chamber 812 at the edge 888 becomes just large enough to provide press-fitting. Since the cooling portion 852 keeps the reverse L-shaped ring rather cool, the edge 888 is also kept cold, especially if welded or otherwise having been integral part of the ring, so that its temperature remains lower than that of the reaction zone, and therefore, the size variation at the edge due to expansion and contraction is lower than for the rest of the reaction chamber 812, which is subjected to the reaction zone temperatures.

Spacers 884 may also be provided to ensure that the cooling gap 850 remains open at all times.

The operation of this embodiment is similar to the operation of previous embodiments. When the temperature is raised during the operation of the reactor, the edge 888 of the reaction chamber 812 remains adequately cool, due to the cooling action of the cooling portion 852 and the cooling gap 850, so that no appreciable expansion occurs at the edge 888 to cause damage.

Figure 12:
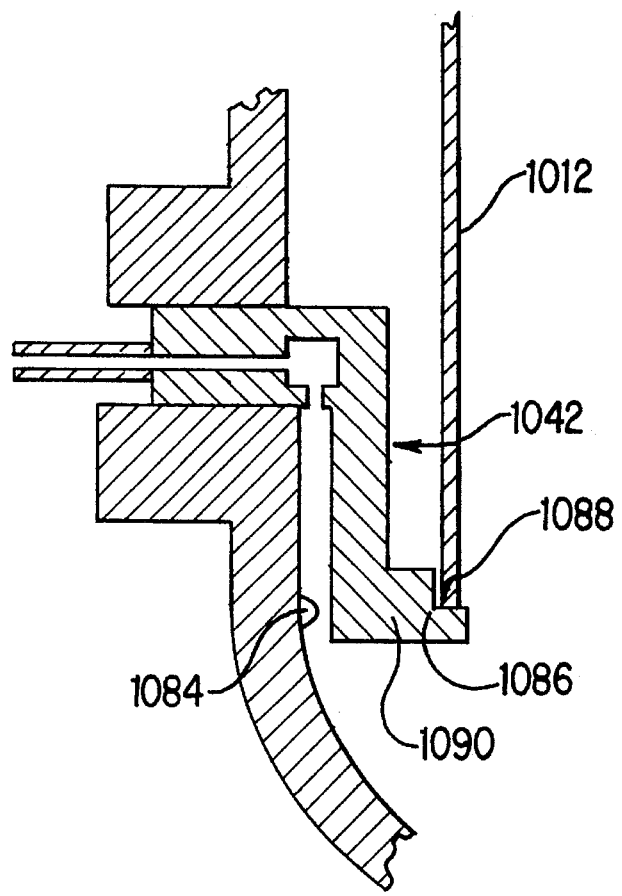
FIG. 12 shows a fragmental cross-sectional schematic diagram of a reactor according to still another preferred embodiment of the present invention, wherein a different type of radial expansion joint is used.

In a very similar embodiment, better shown in FIG. 12, the notch thimble 1086 is disposed on an extension 1090 of the reverse L-shaped ring 1042. The edge 1088 of the back end of the reaction chamber nests in the notch thimble 1086, and spacers 1084 prevent closing of the cooling gap 1050.

The operation of this embodiment is substantially the same as the operation of the preceding embodiment.

Figure 13:
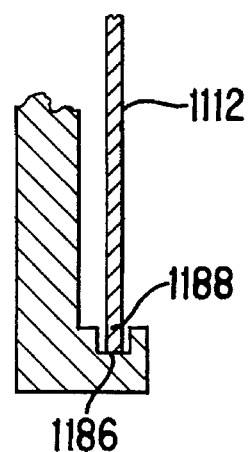
FIG. 13 shows a fragmental cross-sectional schematic diagram of a reactor according to still another preferred embodiment of the present invention, wherein a different type of radial expansion joint is used.

The notch thimble may be replaced by a circular groove 1186 for the edge 1188 of the back end of the reaction chamber 1112 to nest, as better shown in FIG. 13.

The configuration of the embodiments shown in FIGS. 11, 12, and 13, the edge of the back end of the reaction chamber may be just lying within the corresponding notch thimble or circular groove, without the need of hermetical connection. In such a case, the physical isolation between the annulus and the reaction zone will cease to exist, but the operation of the reactor shall rely on chemical isolation, as described in previous embodiments.

Figure 14:
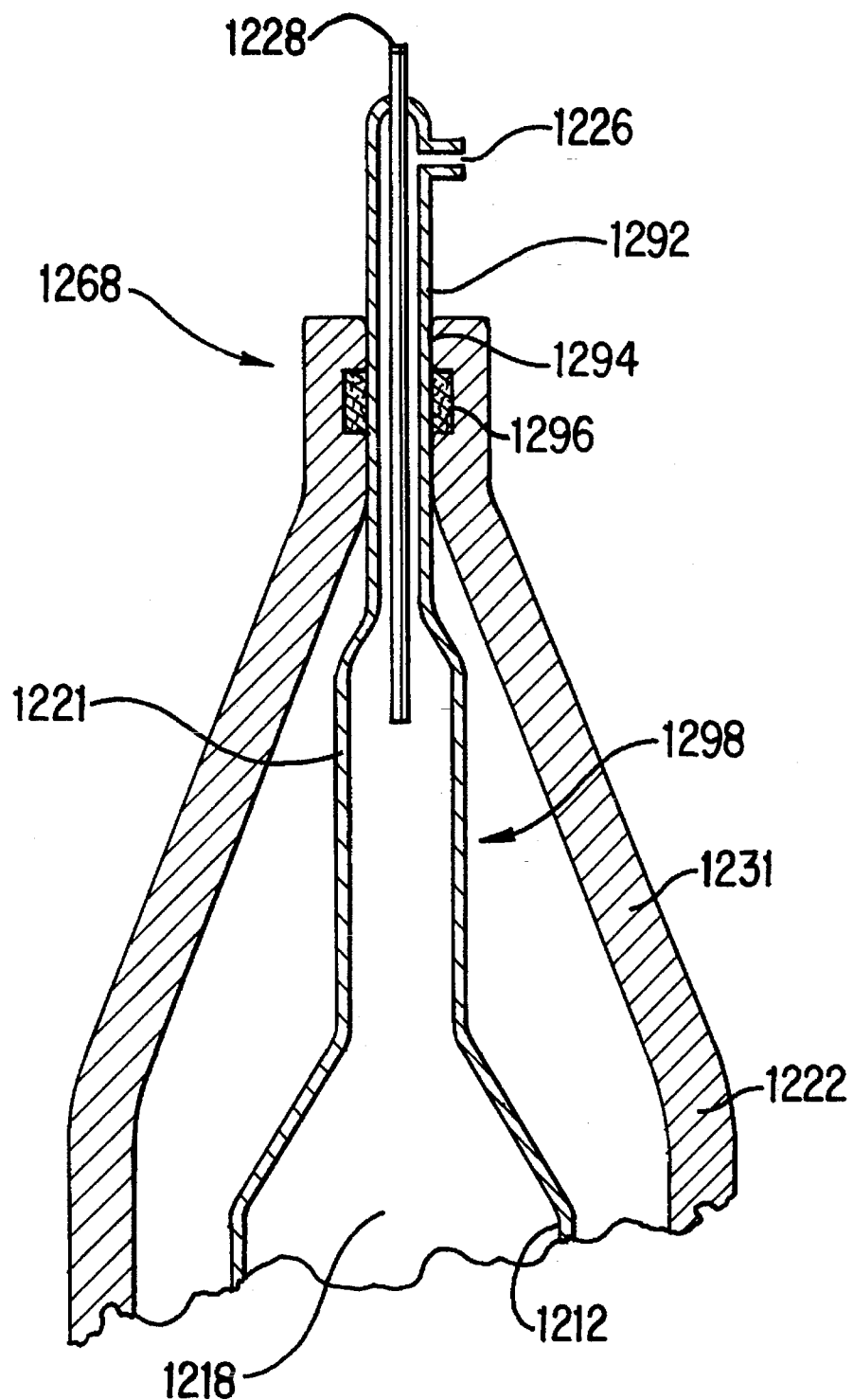
FIG. 14 shows a fragmental cross-sectional schematic diagram of a reactor according to another preferred embodiment of the present invention, wherein a sliding type of longitudinal expansion joint is used.

In another embodiment, better shown in FIG. 14, the longitudinal expansion joint 1268 is a cylindrical extension 1292 of the reaction chamber 1212. The cylindrical extension 1292 has a considerably smaller diameter than the reaction chamber 1212, and it is in slidable engagement with a cylindrical opening 1294 at the head 1231 of the pressure vessel 1222. The slidable engagement is preferably of substantially hermetic nature. One way to achieve good hermetic slidable engagement is by using a stuffing box 1296 containing high temperature resistant packing material. Such stuffing boxes are well known in the art. The small diameter of the cylindrical extension 1292 makes the design of the stuffing box 1296 feasible in this high temperature and high pressure application. The stuffing box design is also facilitated by physically distancing said box from the high temperature region of the reactor, as better shown in FIG. 14. It is advantageous to use also an intermediate extension 1296 between the cylindrical extension 1292 and the front end 1218 of the reaction chamber 1212. The intermediate extension 1296 serves as a premixing chamber 1221 for the reactants introduced through reactant entries 1226 (for waste water, for example) and 1228 (for oxygen, for example). Some leakage from the annulus to the atmosphere through the stuffing box is of no consequence, since the annulus is filled with innocuous fluid, such as an inert gas for example.

The operation of this embodiment is similar to the operation of the previous embodiments. When the temperature is raised during the operation of the reactor, the reaction chamber expands in a longitudinal and a radial manner. The radial expansion is taken care of by the use of any radial expansion joints already described. Regarding longitudinal expansion, as the length of the reaction chamber increases, the cylindrical extension 1292 slides outwardly through the cylindrical opening 1294 and stuffing box 1296 to compensate for the expansion. When the reaction chamber is cooled, the extension 1292 slides back to position, thus preventing formation of catastrophic stresses on the reaction chamber 1212.

It should be pointed out that in the different embodiments of the present invention, oxygen could be replaced by other oxidants or mixtures of oxidants, or mixtures of oxidants and other gases or liquids. It should also pointed out that the reactors of the present invention are particularly useful in the case of supercritical water conditions, especially in the presence of corrosive compounds, such as for example halogens, and the like.

The examples and the description of the above embodiments have been given for illustrating purposes only and they should not be construed as restricting the scope of the present invention. Features described in one embodiment of this invention may be combined with any appropriate features of other embodiments, or replace features of other embodiments for the purpose of exemplifying the scope of the invention.

In the different figures of the drawing, numerals differing by 100 represent elements which are either substantially the same or perform the same function. Therefore, in the case that one element has been defined once in a certain embodiment, its re-definition in other embodiments illustrated in the figures by the same numerals or numerals differing by 100 is not necessary, and it has been often omitted in the above description for purposes of brevity.

What is claimed is:

1. A pressurized reactor, comprising:

a pressure vessel surrounding a reaction chamber, the reaction chamber substantially surrounding at least a portion of a reaction zone, the reaction chamber having an inside wall, an outside wall, a front end, and a back end opposite the front end, and wherein a first annulus is formed between the pressure vessel and the outside wall of the reaction chamber, the pressure vessel having a section which extends beyond the reaction chamber;

a reactant entry conduit coupled to the pressure vessel, the reactant entry conduit being coupled to introduce reactants into or through an upstream portion of the reaction chamber during use;

a reaction effluent conduit coupled to the said section of the pressure vessel, the reactant effluent conduit being coupled to carry reaction effluent from the pressure vessel during use;

a thermal insulator in the first annulus between the outside wall of the reaction chamber and the pressure vessel;

a chemical isolation system coupled to the first annulus, the chemical isolation system comprising an isolation fluid conduit coupled to the first annulus, the chemical isolation system being adapted to introduce isolation fluid from an isolation fluid source into the first annulus at a pressure greater than the pressure within the reaction chamber; and wherein the reactor is coupled to a cooling system, the cooling system comprising a cooling fluid conduit and a cooling fluid source, the cooling fluid conduit being coupled to introduce cooling fluid from the cooling fluid source, through a passageway, and into the said section of the reactor to contact effluent from the reaction chamber during use.

2. A reactor as defined in claim 1, wherein the reactant entry conduit is located at the front end of the reaction chamber.

3. A reactor as defined in claim 1, wherein the reactant entry conduit extends within the reaction chamber.

4. A reactor as defined in claim 3, further comprising a longitudinal expansion joint and a radial expansion joint, both joints being connected to the reaction chamber and isolating the reaction zone from the first annulus.

5. A reactor as defined in claim 3, wherein the reactant entry conduit comprises a premixing chamber.

6. A reactor as defined in claim 5, further comprising a longitudinal expansion joint and a radial expansion joint, both joints being connected to the reaction chamber and isolating the reaction zone from the first annulus.

7. A reactor as defined in claim 6, wherein the reactor is substantially vertically aligned, and wherein the longitudinal expansion joint has the form of a bellow, the bellow having an upper end and a lower end.

8. A reactor as defined in claim 7, wherein the upper end is hermetically connected to the premixing chamber, and the lower end is hermetically connected to the front end wall of the reaction chamber.

9. A reactor as defined in claim 7, wherein the front end of the reaction chamber has a diameter smaller than the diameter in the middle of the reaction chamber.

10. A reactor as defined in claim 1, wherein the thermal insulator comprises an inorganic insulator capable of withstanding temperatures of at least 720° F.

11. A reactor as defined in claim 10, wherein the inorganic insulator comprises a ceramic material.

12. A reactor as defined in claim 10, wherein the inorganic insulator comprises fibrous ceramic paper.

13. A reactor as defined in claim 10, wherein the thermal insulator comprises a radiant shield.

14. A reactor as defined in claim 10, wherein the thermal insulator comprises a mineral.

15. A reactor as defined in claim 1, wherein the thermal insulator comprises a radiant shield.

16. A reactor as defined in claim 1, wherein the chemical isolation system further comprises a valve coupled to introduce an innocuous fluid into the first annulus during use.

17. A reactor as defined in claim 16, wherein the chemical isolation system further comprises a fluid discharge passage between the annulus and the transition zone.

18. A reactor as defined in claim 16, wherein the inside wall of the reaction chamber is at least partially covered with a material resistant to attack by the reactants, products of reaction and effluent gases.

19. A reactor as defined in claim 1, wherein the inside wall of the reaction chamber is at least partially covered with a material resistant to the reactants, products of reaction and effluent gases.

20. A reactor as defined in claim 19, wherein the resistant material comprises a noble metal.

21. A reactor as defined in claim 19, wherein the resistant material comprises titanium.

22. A reactor as defined in claim 1, wherein the section comprises a disengagement section connected to the back end of the reaction chamber such that fluid from the reaction zone flows during use to a transition zone at least partially bounded by the disengagement section at the back end of the reaction chamber, the disengagement section having an inside and an outside wall.

23. A reactor as defined in claim 22, wherein the reaction chamber and the pressure vessel have a tubular configuration.

24. A reactor as defined in claim 22, wherein the pressure vessel and the disengagement section are coupled together with a ring between them, the ring having a L-shaped cross section, in a manner such that a first part of the ring is between the pressure vessel and the disengagement section, and a second part of the ring forms part of the cooling fluid opening of the reaction chamber.

25. A reactor as defined in claim 24, wherein the reactor further comprises a wall having a passageway for additives placed such that additives can be introduced through the passageway and into the transition zone.

26. A reactor as defined in claim 25, wherein the cooling fluid opening and the additives opening are combined into one opening.

27. A reactor as defined in claim 1, wherein the cooling system introduces a film of cooling water on the inside wall of the disengagement section during use.

28. A reactor as defined in claim 1, further comprising a longitudinal expansion joint and a radial expansion joint, both joints being connected to the reaction chamber and isolating the reaction zone from the first annulus.

29. A reactor as defined in claim 28, wherein the longitudinal expansion joint is substantially bellow-shaped.

30. A reactor as defined in claim 28, wherein the radial expansion joint is substantially U-shaped.

31. A reactor as defined in claim 30, further comprising a spacer between a side of the substantially U shaped radial expansion joint and a part of the pressure vessel.

32. A reactor as defined in claim 31 wherein the spacer is connected such that it provides an opening between a side of the substantially U shaped radial expansion joint and the pressure vessel.

33. A reactor as defined in claim 29, wherein the radial expansion joint is substantially U-shaped.

34. A reactor as defined in claim 28, wherein the longitudinal expansion joint is disposed closer to the front end of the reaction chamber, and a radial expansion joint is closer to the back end of the reaction chamber.

35. A reactor as defined in claim 28, wherein the longitudinal expansion joint is a substantially cylindrical extension of the reaction chamber, the substantially cylindrical extension having a smaller diameter than the reaction chamber, and being in slidable engagement with a substantially cylindrical opening of the pressure vessel.

36. A reactor as defined in claim 1, wherein the reaction chamber is made of a material comprising titanium.

37. A reactor as defined in claim 35, further comprising an intermediate extension between the substantially cylindrical extension and the front end of the reaction chamber, the intermediate extension serving as a premixing chamber.

38. A reactor as defined in claim 35, where the slidable engagement comprises a stuffing box and high temperature resistant packing material.

39. A reactor as defined in claim 1, further comprising a disengagement vessel at least partially confining a transition zone at the back end of the reaction chamber, wherein the pressure vessel and the disengagement vessel are connected via a ring having a substantially L-shaped cross section, in a manner that a first part of the ring is confined between the pressure vessel and the disengagement vessel, and a second part of the ring forms part of a cooling gap with the disengagement vessel.

40. A reactor as defined in claim 39, wherein the edge of the back end of the reaction chamber is hermetically sealed on the ring.

41. A reactor as defined in claim 39, further comprising a notch thimble disposed on an extension of the substantially L-shaped ring.

42. A reactor as defined in claim 41, wherein the edge of the back end of the reaction chamber is hermetically sealed on the ring.

43. A reactor as defined in claim 1, wherein the first annulus is pressurized and further comprising a leak detector in the pressurized first annulus adapted to detect corrosive fluids in the first annulus.

44. A reactor as defined in claim 1 wherein the reaction chamber is adapted to contain fluid at a temperature of at least 720° F. and a pressure of at least 3200 p.s.i.a.

45. A reactor as defined in claim 1 wherein the thermal insulator comprises a plurality of sheets of insulation material.

46. A reactor as defined in claim 45 wherein the sheets each comprise a substantially planar surface, and wherein the sheets are placed such that heat energy from the reaction chamber flows substantially perpendicular to such planar surfaces.

47. A reactor as defined in claim 45 wherein the sheets comprise metal.

48. A reactor as defined in claim 1 wherein a ratio of length to width of the reaction chamber is less than about 50:1.

* * * * *